US011881195B2

(12) United States Patent
Sheppard

(10) Patent No.: US 11,881,195 B2
(45) Date of Patent: Jan. 23, 2024

(54) APPARATUS AND METHODS FOR CELLULAR COMPOSITIONS

(71) Applicant: LIFESCORE LIMITED, Salisbury (GB)

(72) Inventor: Philip David Sheppard, Windsor (GB)

(73) Assignee: LIFESCORE LIMITED, Salisbury (GB)

( * ) Notice: Subject to any disclaimer, the term of this patent is extended or adjusted under 35 U.S.C. 154(b) by 52 days.

(21) Appl. No.: 17/542,850

(22) Filed: Dec. 6, 2021

(65) Prior Publication Data

US 2022/0157283 A1 May 19, 2022

Related U.S. Application Data

(63) Continuation of application No. 16/724,816, filed on Dec. 23, 2019, now Pat. No. 11,195,502, which is a continuation of application No. 16/313,499, filed as application No. PCT/GB2017/051928 on Jun. 30, 2017, now Pat. No. 10,839,780.

(30) Foreign Application Priority Data

Jun. 30, 2016 (GB) ..................................... 1611453

(51) Int. Cl.
*G10H 1/00* (2006.01)
*G10H 1/38* (2006.01)

(52) U.S. Cl.
CPC ......... *G10H 1/0025* (2013.01); *G10H 1/0058* (2013.01); *G10H 1/38* (2013.01); *G10H 2210/125* (2013.01); *G10H 2210/145* (2013.01); *G10H 2220/351* (2013.01); *G10H 2220/355* (2013.01); *G10H 2220/371* (2013.01); *G10H 2240/131* (2013.01); *G10H 2240/251* (2013.01)

(58) Field of Classification Search
CPC ........... G10H 1/0025; G10H 2210/125; G10H 1/0041; G10H 2240/251; G10H 2210/105; G10H 2240/131; G10H 1/0058; G10H 2240/145; G10H 7/00; G10H 2210/111; G10H 2210/145; G10H 2220/091; G10H 1/18; G10H 1/365; G10H 2240/085; G10H 2210/036; G10H 2210/056; G10H 2210/061; G10H 2210/071; G10H 2210/081; G10H 2210/151; G10H 2240/031; G10H 2240/081; G10H 2240/105; G10H 1/0066; G10H 1/0083; G10H 1/125
See application file for complete search history.

(56) References Cited

U.S. PATENT DOCUMENTS 9,640,158 B1 * 5/2017 Baker .................. G10H 1/0008
10,839,780 B2 * 11/2020 Sheppard ............. G10H 1/0025
(Continued)

FOREIGN PATENT DOCUMENTS

EP 1845517 A2 6/2009
EP 2495720 A1 9/2012
(Continued)

*Primary Examiner* — Marlon T Fletcher
(74) *Attorney, Agent, or Firm* — Leveque Intellectual Property Law, P.C.

(57) ABSTRACT

Systems, methods and apparatus for cellular compositions/generating music in real-time using cells are provided. The cellular compositions may be dependent on user data.

17 Claims, 22 Drawing Sheets

(56) References Cited

U.S. PATENT DOCUMENTS

| | | | | |
|---|---|---|---|---|
| 11,195,502 | B2 * | 12/2021 | Sheppard | G10H 1/38 |
| 2006/0184558 | A1 | 8/2006 | Martin et al. | |
| 2014/0307878 | A1 | 10/2014 | Osborne et al. | |
| 2015/0013533 | A1 | 1/2015 | Buskies et al. | |
| 2016/0239876 | A1 * | 8/2016 | Ales | G06F 3/165 |
| 2016/0379611 | A1 * | 12/2016 | Georges | H04W 4/14 84/613 |
| 2022/0157283 | A1 * | 5/2022 | Sheppard | G10H 1/0025 |

FOREIGN PATENT DOCUMENTS

| | | | | | |
|---|---|---|---|---|---|
| WO | WO-2006043929 | A1 | * | 4/2006 | G10H 1/00 |
| WO | WO-2015154159 | A1 | * | 10/2015 | G10H 1/00 |
| WO | WO-2018002650 | A1 | * | 1/2018 | G06F 16/60 |

* cited by examiner

Walking/Running Mode

Sitting Mode

Walking/Running Mode

Increasing change magnitude

| Transition Rule | Rotation / Direction of Motion | Speed/ Heart Rate/ Activity | Location |
|---|---|---|---|
| **Chordal shift** | 6° - 12° | 0mph/ resting heart rate/ idle | |
| **Major chordal or minor texture shift** | 13° - 25° | | |
| **Major chordal / major texture shift** | 26° - 49° | | |
| **Module change within module set** | 50° - 89° | <4mph / moderate heart rate / walking | |
| **Module set change** | ≥ 90° | >4mph / hard or max heart rate / jogging or running | Proximity to place of interest |

FIGURE 21

APPARATUS AND METHODS FOR CELLULAR COMPOSITIONS

CROSS-REFERENCE TO RELATED APPLICATIONS

This application is a continuation of U.S. patent application Ser. No. 16/724,816 (filed on Dec. 23, 2019), which is a continuation of U.S. patent application Ser. No. 16/313,499 (filed on Dec. 27, 2018) now U.S. Pat. No. 10,839,780 (issued on Nov. 17, 2020), which is a § 371 (national phase) of international Patent Application Serial No. PCT/GB2017/051928 (filed on Jun. 30, 2017), which claims the benefit of foreign Patent Application Serial No. GB 1611453.0 (filed on Jun. 30, 2016), the disclosures of which are incorporated herein by reference in their entireties.

TECHNICAL FIELD

The present invention generally relates to apparatus, methods and systems for cellular compositions/generating music from cells (i.e. short musical motifs).

BACKGROUND

Music is often listened to on portable electronic devices such as mobile phones, smart phones, tablet devices, and laptops. Users of the portable electronic devices typically select which pieces of music to listen to from a selection of pre-recorded music stored on the device (or accessed via the device), or by choosing a radio station that broadcasts pre-recorded music. A user may select a particular piece of music to listen to depending on their mood, what they are doing (e.g. relaxing, playing sports, going to sleep, etc.), and/or their environment or surroundings. Generally speaking, a user of such a device cannot generate new music in real-time while they are performing another activity (e.g. running).

The present applicant has recognised the need for improved techniques to provide music.

SUMMARY

According to a first aspect of the present invention, there is provided a cellular composition method comprising: at a first apparatus: receiving a request for a cellular composition; receiving user data; and transmitting, to a second apparatus, a control signal comprising the request and user data; at the second apparatus: receiving, from the first apparatus, the control signal; filtering, responsive to the received user data, at least one dataset containing a plurality of modules, each module comprising a plurality of cells; selecting at least one cell from the filtered at least one dataset; and arranging, responsive to the control signal, the at least one cell according to a pathway.

According to a second aspect of the present invention, there is provided a system for cellular compositions, the system comprising: a first apparatus for: receiving a request for a cellular composition; receiving user data; and generating a control signal comprising the request and user data; and a second apparatus for: receiving, from the first apparatus, the control signal; and filtering, responsive to the received user data, at least one dataset containing a plurality of modules, each module comprising a plurality of cells; selecting at least one cell from the filtered at least one dataset; and generating a control signal comprising the selected at least one module; and arranging, responsive to the control signal, the at least one cell according to a pathway.

In embodiments, the step of selecting at least one cell comprises selecting, at the second apparatus, a first cell from a first filtered dataset and a second cell from a second filtered dataset based on properties of the first cell, the method further comprising: at the second apparatus: arranging the first cell according to a first pathway; arranging the second cell according to a second pathway; and wherein the first pathway and second pathway at least partly overlap. The first module may be selected from a harmony dataset, and the second module may be selected from one of: a beats dataset, a solo dataset or an atmosphere dataset. The first pathway and second pathway at least party overlap such that e.g. the harmony of the first module and the musical elements of the second module are at least partly overlaid over each to form a cellular composition.

In embodiments, the cellular composition process may comprise, at the first apparatus, receiving at least one change in user data; and transmitting a modified control signal.

The step of transmitting a modified control signal may comprise: determining, for each change in user data, a change type and a change magnitude; and generating a modified control signal comprising each determined change type and change magnitude In embodiments, the cellular composition process may comprise (at the second apparatus) receiving the modified control signal; identifying at least one transition rule corresponding to each determined change type and change magnitude; and applying the at least one transition rule to the cellular composition.

The step of applying the at least one transition rule may comprise: identifying a cell in the cellular composition to be replaced; determining properties of the identified cell; selecting, based on the transition rule and the determined properties of the cell, a new cell from within the at least one dataset; and replacing the identified cell in the cellular composition with the selected new cell.

According to a further aspect of the present invention, there is provided an apparatus for generating/composing music, the apparatus comprising: a user interface configured to receive a request to compose music; and a processor configured to, responsive to the received request: receive user data; filter, responsive to the received user data, at least one dataset containing a plurality of pre-recorded items of music; select at least one pre-recorded item of music from the filtered at least one dataset; compose music using the or each selected pre-recorded item of music; and generate metadata associated with the composed music.

According to a further aspect of the present invention, there is provided a method for generating/composing music, the method comprising: receiving a request to compose music; receiving user data; filtering, responsive to the received user data, at least one dataset containing a plurality of pre-recorded items of music; selecting at least one pre-recorded item of music from the filtered at least one dataset; generating music using the or each selected pre-recorded item of music; and generating metadata associated with the composed music.

According to a further aspect of the invention, there is provided a system for generating/composing music, the system comprising: a remote data store comprising at least one dataset containing a plurality of pre-recorded items of music; and an apparatus comprising: a user interface configured to receive a request to compose music; a processor; and a communication module, coupled to the processor, to:

receive user data; transmit the received user data to the remote data store with a request to compose music; and wherein the processor is configured to generate metadata associated with the composed music.

The following features apply equally to each aspect of the invention.

The cellular composition/music generation method may be implemented on a single apparatus (e.g. a user device). The apparatus may be any user electronic device, such as, but not limited to, a computer, a laptop, a desktop PC, a smartphone, a smartwatch, or a tablet computer. The apparatus may, more broadly, be any device owned or used by a user, such as an Internet of Things (IoT) device, a toy (e.g. remote-controlled car, an action figure, etc.), a gaming system (e.g. a computer gaming system, a virtual reality gaming system, etc), a virtual reality device/headset/system, a vehicle (e.g. a car), etc. In embodiments, the apparatus comprises means for connecting to a remote data store containing pre-recorded items of music, such as via the Internet or via a mobile (cellular) network. In embodiments, motion of the user may be used to compose music, which may be detected via the user device (or by sensors/devices couplable to the user device). In embodiments, motion of the device, or associated with the device, may be used to compose music. For example, motion of a character in a video game, or of an avatar in a virtual reality environment, or of a car, or of a toy, may be used to compose music.

In embodiments, steps of the cellular composition/music generation method may be distributed between two or more apparatuses, for example between a user device and a remote server, or between a remote server and a music production component, or between a user device, remote server and a music production component. Accordingly, in the following, the processor which performs steps of the cellular composition/music generation process may be located in a user device, a remote server and/or music production component.

In embodiments, the processor (located in the user apparatus, or remote to the apparatus) is configured to: select at least two pre-recorded items of music from at least two filtered datasets; and combine the selected pre-recorded items of music to compose (original) music.

In embodiments, the processor (located in the user apparatus, or remote to the apparatus) is configured to compose music by: modifying a characteristic of the or each selected pre-recorded item of music. Preferably, the processor modifies a characteristic of the or each selected pre-recorded item of music by modifying at least one of: pitch, key, melody, rhythm, timbre, form, and tempo.

The at least one dataset (located in the user apparatus, or remote to the apparatus) comprises a harmony dataset and the processor is configured to: filter, responsive to the received user data, the harmony dataset; and select the pre-recorded item of music from the filtered harmony dataset.

In embodiments, the at least one dataset (located in the user apparatus, or remote to the apparatus) comprises a harmony dataset, a beat dataset, a solo dataset and an atmosphere dataset, and wherein the processor is configured to: filter, responsive to the received user data, the harmony dataset, the beat dataset, the solo dataset and the atmosphere dataset; and select a first pre-recorded item of music from the filtered harmony dataset; and select a further pre-recorded item of music from one or more of: the filtered beat dataset, the filtered solo dataset, and the filtered atmosphere dataset. The processor (in the apparatus or remote to the apparatus) is configured to combine the selected first pre-recorded item of music and the or each further pre-recorded item of music to compose music.

In embodiments, the processor is configured to further filter the beat dataset, the solo dataset and the atmosphere dataset based on the selected first pre-recorded item of music.

In embodiments, the processor is configured to: receive a change in user data; and modify, responsive to the change in user data, the composed music. The processor may modify the composed music by: modifying at least one characteristic of the composed music. Additionally or alternatively, the processor may modify the composed music by: selecting at least one further pre-recorded item of music from the at least one dataset; and replacing one pre-recorded item of music in the composed music with the selected further pre-recorded item of music.

The user data may comprise one or more of: time of received request to compose music, date of received request to compose music, weather conditions when request to compose music is received, biometric data, pace, speed, mode of travel, heart rate, location, GPS location, and direction of movement. Thus, the user data may comprise data about the user, data related to the conditions under which the request to compose music is received (e.g. time, date, weather), or a combination of both. The user data may be obtained from one or more sensors (contained within the user device/apparatus, or located external to the user device), such as an accelerometer, a pedometer, a heart rate monitor, a fitness tracker, a GPS tracker, etc. The conditions data may be obtained from the user device itself (e.g. for time and date), via the Internet (e.g. a meteorological data website, a national or regional weather service, or the UK's Met Office website for weather data), etc.

In embodiments, the processor (in, or remote to, the user apparatus) is configured to: receive a change in user data relating to one or more of: pace, speed and heart rate; and modify, responsive to the change in user data, the tempo of the composed music.

In embodiments, the processor is configured to: receive a change in user data relating to one or more of: pace, speed and heart rate; select, responsive to the change in user data, a further pre-recorded item of music from the beats dataset; and modify the composed music to incorporate the further pre-recorded item of music from the beats dataset.

In embodiments, the processor is configured to: receive a change in user data relating to direction of travel; and modify, responsive to the change in user data, a key of the composed music. For example, the processor: determines an angle by which the direction of travel has changed; determines, from a lookup table, a predefined change in key corresponding to the determined angle; and modifies the composed music to the determined predefined key.

In embodiments, the processor is configured to: receive a change in user data relating to location; select, responsive to the change in user data, a further pre-recorded item of music from the atmosphere dataset; and modify the composed music to incorporate the further pre-recorded item of music from the atmosphere dataset.

In embodiments, the processor is configured to change at least one characteristic of the composed music after a predetermined period of time, if no change in user data is received within the period of time.

In embodiments, the user interface of the apparatus is configured to receive an operation mode selection, and the processor (in, or remote to the user apparatus) is configured to: filter, responsive to the selected operation mode, at least one dataset containing a plurality of pre-recorded items of music.

In embodiments, the user interface is configured to receive a selection of one or more of: key, pattern and variation, and the processor is configured to: filter, responsive to the received selection, at least one dataset containing a plurality of pre-recorded items of music.

In embodiments, the apparatus comprises a data store to store the generated metadata. The data store in the apparatus may contain the at least one dataset of pre-recorded items of music. In additional or alternative embodiments, the at least one dataset of pre-recorded items of music is located in a remote data store.

In embodiments, the apparatus comprises a communication module configured to receive user data from an external device. The external device may be a sensor, such as an accelerometer, a pedometer, a heart rate monitor, a fitness tracker, a GPS tracker, etc.

The communication module may be configured to: transmit user data to a remote data store comprising the at least one dataset containing the pre-recorded items of music; receive at least one pre-recorded item of music from the remote data store. Additionally or alternatively, the communication module may be configured to: transmit user data to a remote data store comprising the at least one dataset containing the pre-recorded items of music; receive composed music, based on the user data, from the remote data store.

In embodiments, the user interface of the apparatus is configured to receive feedback data on the composed music. The processor may be configured to: filter, responsive to the received feedback data, the at least one dataset containing the pre-recorded items of music.

In embodiments, the apparatus comprises a camera configured to capture an image or record a video, and the processor is configured to: output the composed music; determine the camera has captured an image while the composed music is outputted; create a link between the captured image and the composed music.

In embodiments, the user interface is configured to receive a request to replay composed music, and the processor is configured to: retrieve metadata associated with the composed music; retrieve, using the metadata, the or each pre-recorded item of music which forms the composed music from the at least one dataset; modify, using the metadata, the or each retrieved pre-recorded item of music; and re-compose the composed music.

In embodiments, the method comprises: selecting at least two pre-recorded items of music from at least two filtered datasets; and combining the selected pre-recorded items of music to compose music.

The step to compose music may comprise: modifying a characteristic of the or each selected pre-recorded item of music. Additionally or alternatively, the step to compose music may comprise: receiving a change in user data; and modifying, responsive to the change in user data, at least one characteristic of the composed music.

In embodiments, the method comprises receiving a change in user data relating to direction of travel; determining an angle by which the direction of travel has changed; determining, using a lookup table, a predefined change in key corresponding to the determined angle; and modifying the composed music to the determined predefined key.

In embodiments, the method further comprises: receiving feedback data on the composed music; and filtering, responsive to the received feedback data, the at least one dataset containing the pre-recorded items of music.

In embodiments, the method further comprises: outputting the composed music; receiving, from a camera, an image captured while the composed music is outputted; and creating a link between the captured image and the composed music.

In embodiments, the remote data store is configured to: filter, responsive to the received user data, the at least one dataset containing the pre-recorded items of music; and select at least one pre-recorded item of music from the filtered at least one dataset.

The remote data store may be configured to transmit the selected at least one pre-recorded item of music to the communication module of the apparatus, and wherein the processor is configured to compose music using the selected at least one pre-recorded item of music.

The remote processor may be configured to: receive the selected at least one pre-recorded item of music from the remote data store; compose music using the or each selected pre-recorded item of music; and transmit the composed music to the communication module of the apparatus.

The remote processor may be configured to: receive at least two selected pre-recorded items of music from the remote data store; and combine the received pre-recorded items of music to compose music.

The remote processor may be configured to compose music by: modifying a characteristic of the or each selected pre-recorded item of music.

The remote data store may comprise a harmony dataset, a beat dataset, a solo dataset and an atmosphere dataset, and wherein the remote processor is configured to: filter, responsive to the received user data, the harmony dataset, the beat dataset, the solo dataset and the atmosphere dataset; and select a first pre-recorded item of music from the filtered harmony dataset; and select a further pre-recorded item of music from one or more of: the filtered beat dataset, the filtered solo dataset, and the filtered atmosphere dataset.

The communication module of the apparatus may be configured to: receive a change in user data; and transmit the received change in user data to the remote processor. The remote processor may be configured to: modify, responsive to the change in user data, the composed music; and transmit the modified composed music to the communication module.

The system may further comprise at least one sensor to sense user data. In particular embodiments, the at least one sensor may be contained within the apparatus. In additional or alternative embodiments, the at least one sensor may be coupleable to the apparatus, via a wired or wireless means. The at least one sensor may be configured to sense one or more of: biometric data, pace, speed, heart rate, location, GPS location, and direction of movement.

In embodiments, the remote processor is configured to: receive a change in user data relating to one or more of: pace, speed and heart rate; and modify, responsive to the change in user data, the tempo of the composed music.

In a related aspect of the invention, there is provided a non-transitory data carrier carrying processor control code to implement the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

BRIEF DESCRIPTION OF THE DRAWINGS

The techniques are diagrammatically illustrated, by way of example, in the accompanying drawings, in which:

FIG. 21 shows a table of example change types and change magnitudes and example corresponding transition rules.

DETAILED DESCRIPTION

Figure 1A:
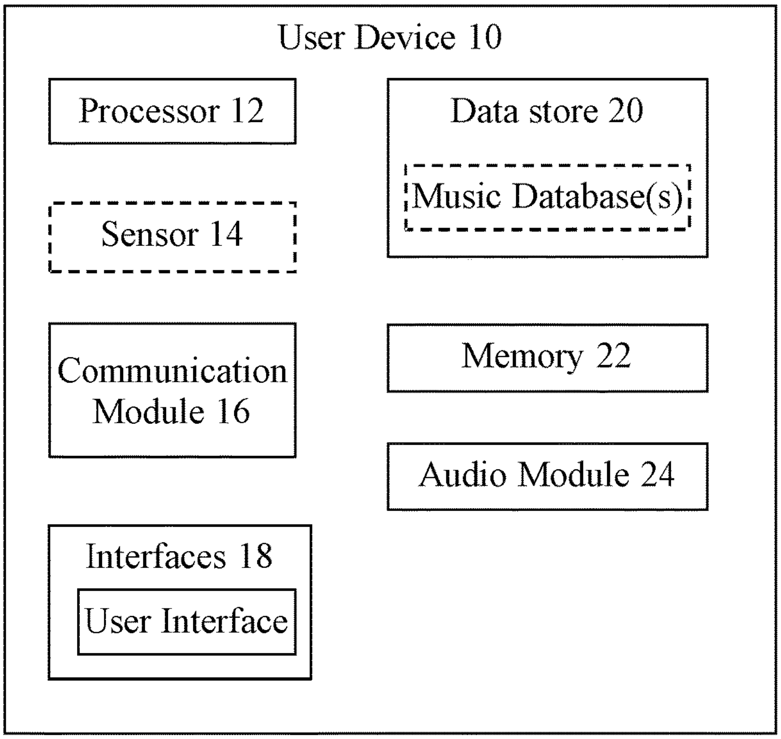
FIG. 1*a* shows a schematic view of a device for generating music.

Broadly speaking, embodiments of the present invention provide methods, systems and apparatus for generating music (or cellular compositions) in real-time using one or more pre-recorded items of music (or modules comprising one or more cells that run on pathways), where the generated music/cellular composition is dependent on user data. The user data may comprise data relating to the initial conditions when a user requests music to be generated (such as time, date, season, weather and location), and may comprise data relating to variable conditions which change in real-time (such as location, direction of motion/travel, speed of travel, and heart rate). The generated music/cellular composition may be generated based on the initial conditions, and may be modified in real-time dependent on the variable conditions. For example, an increase in a user's heart rate may cause the tempo of the generated music/cellular composition to be increased, and a change in the user's direction of motion may cause a change in the key of the generated music/cellular composition. Thus, the generated music/cellular composition is dependent on user data and can be changed by the user in real-time. This may result in substantially unique pieces of music/cellular compositions being generated for a user.

The term "harmony" or "harmony layer" is used herein to mean an arrangement of simultaneous musical pitches, tones, notes or chords, which may be played or sung at the same time (or one after the other), and which often produce a pleasing sound.

The term "beat" or "beats" or "beats layer" is used herein to mean a rhythmic movement or the speed at which a piece of music is played, which typically form the pulses or extra rhythmic elements of a piece of music. The beat may be provided by the playing of a percussion instrument. For example, a beat may be the rhythmic noise played on a drum.

The term "solo" or "solo layer" is used herein to mean a piece of music (or a section of music) that is played or sung by a single performer, and/or to mean a melody (i.e. a sequence/arrangement of single notes that form a distinct musical phrase or idea).

The term "atmosphere" or "atmosphere layer" is used herein to generally mean a sound effect, a recording of text or spoken word, an ambient sound, etc., which may not necessarily be musical. Examples include readings of poems, a recording of the "dawn chorus", and the sound of rainfall.

In embodiments, the generated music may be composed of one or more pre-recorded items of music depending on the user data (and possibly any user preferences), and each pre-recorded item of music may be used with or without modification. Generally speaking, a piece of music may comprise multiple musical layers, for example one or more of: a harmony layer, a beats layer, a solo layer, and an atmosphere layer. In embodiments of the present techniques, a piece of generated music may be composed of pre-recorded items of music selected from one or more of: a harmony dataset, a beats dataset, a solo dataset, and an atmosphere dataset. Each dataset comprises a plurality of pre-recorded items of music. For example, the harmony dataset comprises a plurality of pre-recorded items of harmony layers, and the beats layer comprises a plurality of pre-recorded items of beats layers. The generated music may be composed by selecting a pre-recorded item of music from one or more dataset. If multiple items of music are selected from the datasets, the generated music is composed of the combination of the selected items of music. One or more of the selected items of music may be modified to form the generated music. For example, the pitch of the selected harmony may be modified based on user data. How the or each item of music is selected from the datasets, and possibly modified, may be dependent on user data, and is described in more detail below.

The term "pre-recorded item of music" is used interchangeably herein with the term "item of music", "music item", "music layer", and "layer".

The term "generate music" is used to mean composing music in real-time from one or more cells (i.e. pre-recorded items of music or short musical motifs) that are selected based on user data or 'initial conditions', and to mean modifying the composed music in real-time based on changes in user data or 'variable conditions'.

In embodiments, a cellular composition may be formed from one or more modules depending on the user data (and possibly any user preferences). Generally speaking, a cellular composition may comprise multiple musical layers, for example one or more of: a harmony layer, a beats layer, a solo layer, and an atmosphere layer. In embodiments, a cellular composition may be composed of modules selected from one or more of: a harmony dataset, a beats dataset, a solo dataset, and an atmosphere dataset. Each dataset comprises a plurality of module sets, each module set comprising a plurality of modules. A module comprises a plurality of cells. A cell is a short musical motif or phrase with a harmony and internal patterns, similar to an ostinato. Each cell within a module may have the same motif but with a different key or chord. A module set comprises modules which are closely related, i.e. they have similar characteristics. For example, the modules within a module set may have the same harmonic characteristics but different textures. Module sets may be very different to each other, such that switching between module sets causes a significant change in the cellular composition.

The harmony dataset comprises a plurality of module sets which form harmony layers, and the beats layer comprises a plurality of module sets which form beats layers, etc. The cellular composition may be formed by selecting a module set from one or more datasets. If multiple module sets are selected from the datasets, the cellular composition is formed of the combination of the selected module sets (specifically, a module within each of the selected module sets). How the or each module/module set is selected from the datasets may be dependent on user data, and is described in more detail below.

The term "generated music" is used interchangeably herein with the term "cellular composition".

A user may use a user device to obtain generated music/create a cellular composition. The user device may be any user electronic device, such as, but not limited to, a computer, a laptop, a desktop PC, a smartphone, a smartwatch, or a tablet computer. In embodiments, the user device may be used to generate music and therefore, may comprise libraries of pre-recorded items of music and instructions on how to compose music in real-time using these items of music and user data. The instructions may be provided in the form of software or computer control code. The instructions may be provided as part of a "software app" which the user may be able to download, install and run on the user device. In embodiments, the process to compose music may be distributed between the user device and a remote server. The remote server may comprise a remote dataset which contains the libraries of pre-recorded items of music. In embodiments, the remote server may comprise a remote dataset and a remote processing means to compose music. In any case, the user device is used to deliver the composed music to the user.

FIG. 1*a* shows a schematic view of an example user device 10 for generating music. The user device 10 may be used to compose music, or may be part of a larger system to compose music. The user device comprises at least one processor 12, which may comprise processing logic to process data (e.g. user data, programs, instructions received from a user, etc.) In embodiments, the processor 12 may be configured to output generated music/a cellular composition to a user, in response to the processing. The processor 12 may be a microcontroller or microprocessor. The processor 12 may be coupled to at least one memory 22. The memory 22 may comprise working memory, and program memory storing computer program code to implement all or part of the music generation/cellular composition process described herein. The program memory of memory 22 may be used for buffering data while executing computer program code, for example for buffering any received user data before using the user data to generate music/modify generated music, and/or for buffering any generated music before outputting to the user.

In embodiments, the user device 10 may comprise at least one sensor 14. The at least one sensor 14 may comprise any one or more of: an accelerometer (which may be used as part of a pedometer), a gyroscope (which may be used to sense direction and/or motion), a location sensor such as a GPS sensor (which may be used to provide information on the location of the user device 10 and/or speed of a user of the user device 10), and a heart rate monitor. However, this is a non-exhaustive list, and the at least one sensor 14 may be any sensor capable of providing information about the user and/or the user's surroundings/environment. In embodiments, the user device 10 may not comprise a sensor 14, and the sensor(s) 14 may instead be provided external to the user device 10. In embodiments, the user device 10 may comprise one or more sensors 14, and one or more additional sensors 14 may be provided external to the user device 10. The external sensors 14 may be able to communicate with the user device 10, via a wired or wireless connection. For example, the external sensor(s) 14 may use Bluetooth®, WiFi, Bluetooth Low Energy®, or any other communication protocol to transmit sensed user data to the user device 10.

Data received from any external sensors 14, or any other devices, may be received at communication module 16 of user device 10. The communication module 16 may be configured to send and/or receive data from external devices (e.g. external sensors, pedometers, heart rate monitors, fitness trackers). The communication module 16 may be configured to send and/or receive data from external sources, such as the Internet or a remote server.

The user device 10 may comprise interfaces 18, such as a conventional computer screen/display screen, keyboard, mouse, and/or other interfaces such as a network interface and software interfaces. The interfaces 18 may comprise a user interface such as a graphical user interface (GUI), touch screen, microphone, voice/speech recognition interface, physical or virtual buttons. The user interfaces may be configured to receive user data and/or user input. For example, a user may use the user interface to make a request for composed music—the request may be made by selecting/initiating a software 'app' on a display screen of the user device 10, via a voice command, or otherwise. The user interface may be configured to receive user feedback on a piece of generated music, and/or to receive user requests to modify (or save, or buy, etc.) a piece of generated music.

In embodiments, the user device 10 comprises means for connecting to a remote data store containing pre-recorded items of music. The communication module 16 and/or interfaces 18 (or a dedicated communication module) may be used to connect the user device 10 to the remote data store, such as via the Internet or via a mobile (cellular) network.

The user device 10 comprises a data store 20 configured to store, for example, user data and any user preferences in relation to music generation. The data store 20 may comprise one or more music datasets comprising a plurality of pre-recorded items of music. In embodiments, the user device 10 may be configured to locally store in the data store 20 all, or a subset of, the available pre-recorded items of music used to compose music. The locally-stored items of music may be stored within music datasets in the data store 20. In embodiments where the music generation is performed by the user device 10, it may be more efficient to store all, or a subset of, the available pre-recorded items of music within the user device 10 (i.e. within data store 20). This may avoid the need for the user device 10 to fetch pre-recorded items of music from a remote server when a user requests music to be composed, which could be time-consuming (resulting in a delay in providing the composed music), and/or may consume a large portion of a user's mobile phone data allowance. The data store 20 may store a subset of the available pre-recorded items of music based on user preferences/criteria. The user preferences/criteria may indicate which types of music the user likes or dislikes, for example, and the data store may store only those pre-recorded items of music which satisfy the user criteria. Additionally or alternatively, the data store 20 may store a subset of the available pre-recorded items of music if the user device 10 does not comprise sufficient memory to store all of the available items of music.

The memory 22 and/or the data store 20 may comprise a volatile memory such as a random access memory (RAM), for use as temporary memory whilst the processor 12 is processing user data or performing tasks in relation to music generation. Additionally or alternatively, the memory 22 and/or the data store 20 may comprise non-volatile memory such as Flash, read only memory (ROM) or electrically erasable programmable ROM (EEPROM), for storing data, programs, or instructions received or processed by the processor 12.

The user device 10 may comprise an audio module 24 to provide the composed music to the user. For example, the audio module 24 may comprise means to convert an electrical signal forming the composed music into an audio signal, and for outputting the audio signal (e.g. via speakers or to headphones/headsets coupled to the user device 10).

Figure 1B:
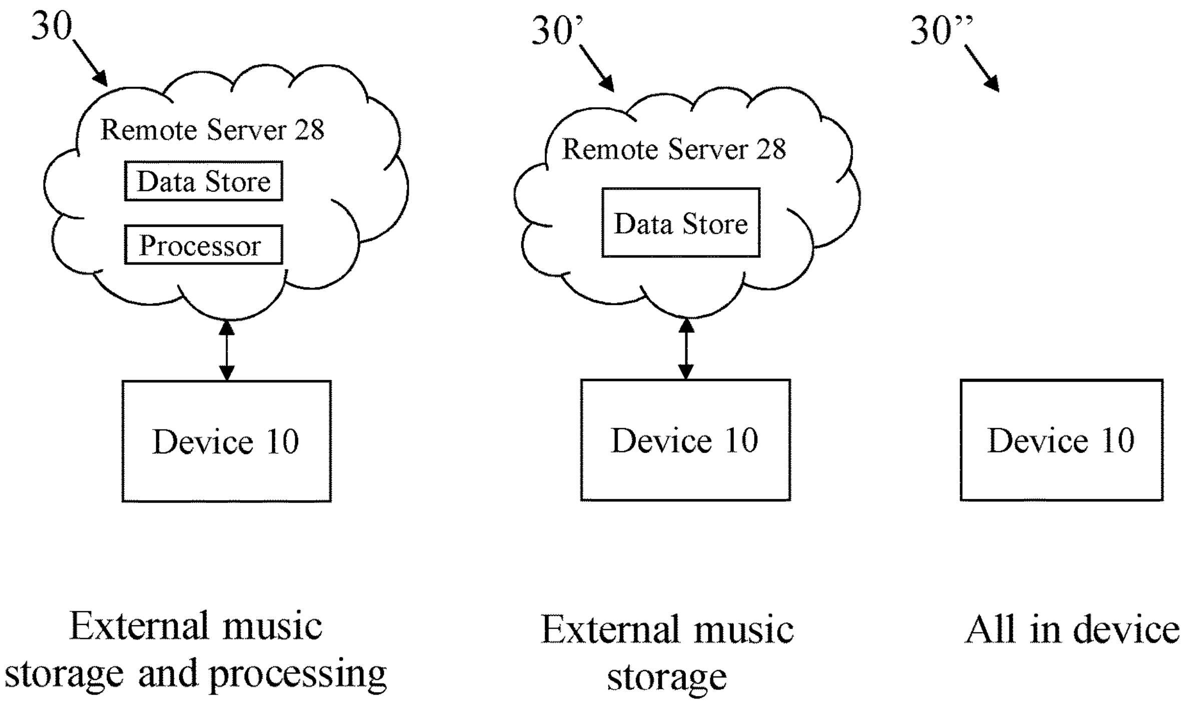
FIG. 1*b* shows schematic diagrams of systems used to compose music.

FIG. 1*b* shows schematic diagrams of example systems which may be used to compose music. These are just some examples of how the music generation methods described herein may be implemented, and are non-limiting.

As mentioned earlier, the music generation process may take place within a user device 10—this is shown in system 30" in FIG. 1*b*. In system 30", all of the processing required to compose music is performed within user device 10. In system 30", the user device 10 may store the instructions to implement the methods described herein to compose music, and may store all (or a subset of) the available pre-recorded items of music from which music is composed. The user device 10 may be able to connect to a remote server to obtain items of music to store locally (e.g. in data store 20). The user device 10 may be able to connect to any external devices which provide user data.

An advantage of system 30" is that a connection to a remote server is not required when music is to be composed, since the music generation process occurs substantially entirely within user device 10. This could be particularly advantageous if a user of user device 10 is in a location where a connection to a remote server is not possible (e.g. in remote locations where there is no internet and/or mobile network connectivity). A further advantage of system 30" is that a user's mobile data allowance and/or broadband data allowance is not consumed whenever the user device 10 composes music, because the user device 10 does not need to fetch items of music from the remote server each time music is generated. A further advantage of system 30" is that music can be generated in real-time in response to received user data and received changes in user data, without a significant delay between receiving user data and outputting the generated music in response (because the user device 10 does not have to connect to a remote server).

Additionally or alternatively, the music generation process may be distributed between user device 10 and a remote server 28, as shown by system 30' in FIG. 1*b*. In system 30', remote server 28 is located remote to the user device 10, and may be part of a cloud computing system. The remote server 28 may comprise a data store which stores the available pre-recorded items of music for use in a music generation process. In system 30', when a user requests music to be composed, user device 10 may transmit user data to the remote server 28. The remote server 28 may use the user data to select and retrieve one or more pre-recorded items of music from the remote data store, and transmit these selected items of music to the user device 10. The processor 12 of user device 10 composes music using the or each selected item of music and provides the composed music to the user. Thus, in system 30', the music libraries (i.e. music datasets) are stored remote to the user device 10. An advantage of system 30' is that user device 10 may not store a local copy of all (or a subset of) the available pre-recorded items of music, which could use a large amount of available memory/data storage space in the user device 10. A further advantage of system 30' is that the processor 12 of user device 10 may not need to know how to select items of music from the music datasets based on user data. Instead, this operation is performed by the remote server 28, which may reduce the amount of processing (or complexity of processing) to be performed by user device 10, which may, in embodiments, use less power than system 30". A further advantage of system 30' is that the music datasets may be updated regularly and centrally, without requiring each user device 10 to download the updated music datasets.

Additionally or alternatively, the music generation process may be distributed between user device 10 and a remote server 28, as shown by system 30 in FIG. 1*b*. In system 30, remote server 28 is located remote to the user device 10, and may be part of a cloud computing system. The remote server 28 may comprise a data store which stores the available pre-recorded items of music for use in a music generation process. The remote server 28 may comprise a processor or processing capabilities, to generate music in response to received user data.

In system 30, when a user requests music to be composed, user device 10 may transmit user data to the remote server 28. The remote server 28 may use the user data to select and retrieve one or more pre-recorded items of music from the remote data store. The processor of remote server 28 uses the selected items of music to compose music, and once composed, the remote server 28 provides the composed music to the user. In embodiments, the user device 10 streams the composed music from the remote server 28 and does not download the composed music. As mentioned earlier, the composed music is composed in response to user data and changes in user data, and thus the composed music changes in real-time depending on user data. Thus, streaming the composed music from the remote server 28 may be advantageous since it may be a faster and more efficient process to deliver the composed music to a user in real-time, than if the user device 10 had to download the generated music each time it is created and/or modified. Thus, in system 30, the music libraries (i.e. music datasets) are stored remote to the user device 10 and the processing required to generate/compose music is performed remote to the user device 10. The user device 10 simply transmits requests for generated music and user data to the remote server. An advantage of system 30 is that user device 10 may not store a local copy of all (or a subset of) the available pre-recorded items of music, which could use a large amount of available memory/data storage space in the user device 10. A further advantage of system 30 is that the processor 12 of user device 10 does not need to know how to select items of music from the music datasets based on user data. Instead, this operation is performed by the remote server 28, which may reduce the amount of processing (or complexity of processing) to be performed by user device 10, which may, in embodiments, use less power than system 30" and 30'. A further advantage of system 30 is that the music datasets may be updated regularly and centrally, without requiring each user device 10 to download the updated music datasets.

Figure 1C:
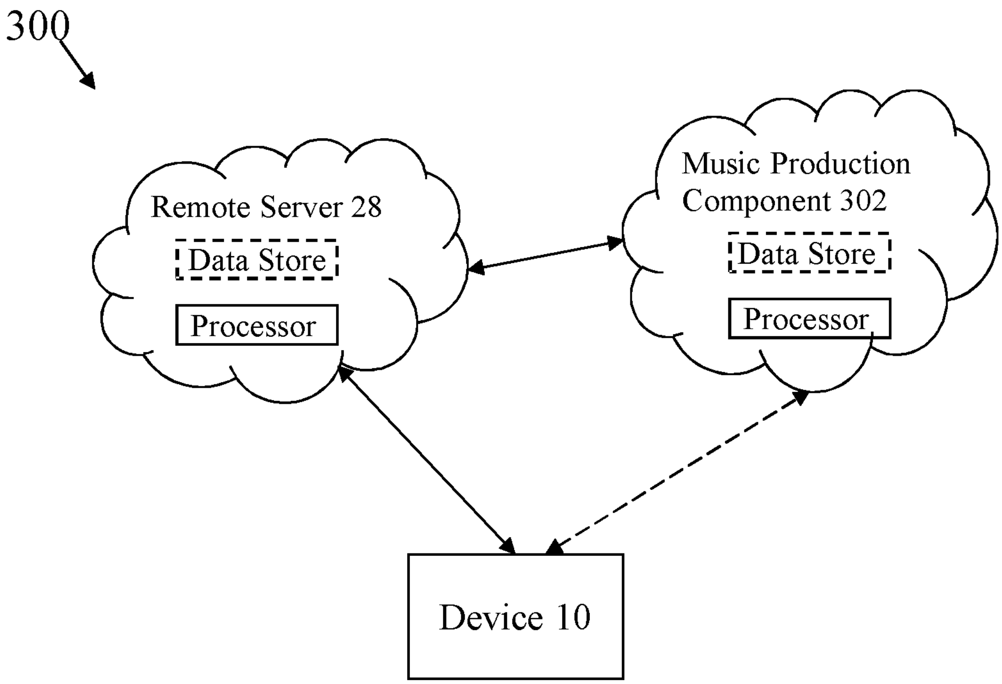
FIG. 1*c* shows a schematic diagram of a system for a cellular composition.

FIG. 1*c* shows a schematic diagrams of an example system which may be used to generate music/cellular compositions. In system 300, when a user requests a cellular composition, user device 10 may transmit user data to the remote server 28. The remote server 28 may use the user data to select and retrieve one or more modules from a remote data store. In embodiments, the remote dataset may be located within remote server 28—in this case, the selections can be made from the remote data store directly. In alternative embodiments, the remote dataset may be located within a separate music production component 302—in this case, the remote server 28 may consult a list of module sets corresponding to the modules in the remote dataset of the music production component, and make selections from this list. In embodiments, both the remote server 28 and the music production component 302 may comprise at least one dataset from which modules may be selected.

The remote server 28 transmits a control signal to the music production component 302, the control signal comprising the selected module(s) or an indication of which module(s) has been selected. The music production component 302 receives the control signal and arranges, responsive to the control signal, each cell of the plurality of cells within each selected module into a pathway. The pathway indicates the progression from one cell to another cell. By default, each cell may be looped or repeated within the cellular composition. That is, the cellular composition may be formed of the same cell being repeated. In the absence of any change in user data, the same cell may be repeated for a certain duration before the cell is replaced with a new cell (from the same module) in the cellular composition. The cell transitions in the absence of any change in user data may be based on predetermined rules. The rules may specify, for example, which cell follows another cell. Accordingly, the music production component 302 may arrange the plurality of cells in each selected module into a default pathway, to form the cellular composition. The music production component 302 may transmit the cellular composition directly to device 10, or to the device 10 via the remote server 28.

In embodiments, the user device 10 streams the cellular composition from the remote server 28 or the music production component 302, and does not download the cellular composition. As mentioned earlier, the cellular composition is formed in response to user data and changes in user data, and thus the cellular composition may change in real-time in response to changes in user data. Thus, streaming the cellular composition from the remote server 28/music production component 302 may be advantageous since it may be a faster and more efficient process to deliver the cellular composition to a user in real-time, than if the user device 10 had to download the cellular composition each time it is created and/or modified. Thus, in system 300, the libraries of modules (i.e. music datasets) are stored remote to the user device 10 and the processing required to generate/compose music is performed remote to the user device 10. The user device 10 simply transmits requests for cellular compositions and user data to the remote server. An advantage of system 300 is that user device 10 may not store a local copy of all (or a subset of) the available modules or module sets, which could use a large amount of available memory/data storage space in the user device 10. A further advantage of system 300 is that the processor 12 of user device 10 does not need to know how to select modules from the music datasets based on user data. Instead, this operation is performed by the remote server 28, which may reduce the amount of processing (or complexity of processing) to be performed by user device 10, which may, in embodiments, use less power than system 30" and 30'. A further advantage of system 300 is that the module datasets may be updated regularly and centrally, without requiring each user device 10 to download the updated datasets.

In embodiments, there is provided a cellular composition method comprising: at a first apparatus: receiving a request for a cellular composition; receiving user data; filtering, responsive to the received user data, at least one dataset containing a plurality of modules, each module comprising a plurality of cells; selecting at least one module from the filtered at least one dataset; and transmitting, to a second apparatus, a control signal comprising the selected at least one module; at the second apparatus: receiving, from the first apparatus, the control signal; and arranging, responsive to the control signal, each cell of the plurality of cells within the or each selected module into a pathway. In the system 300 of FIG. 1*c*, the remote server 28 may be considered a first apparatus and the music production component 302 may be considered a second apparatus. In FIG. 1*b*, the remote server 28 may be considered a first apparatus and the device 10 may be considered a second apparatus. (Alternatively, the device 10 may be considered a first apparatus and the remote server 28 may be considered a second apparatus).

Figure 2A:
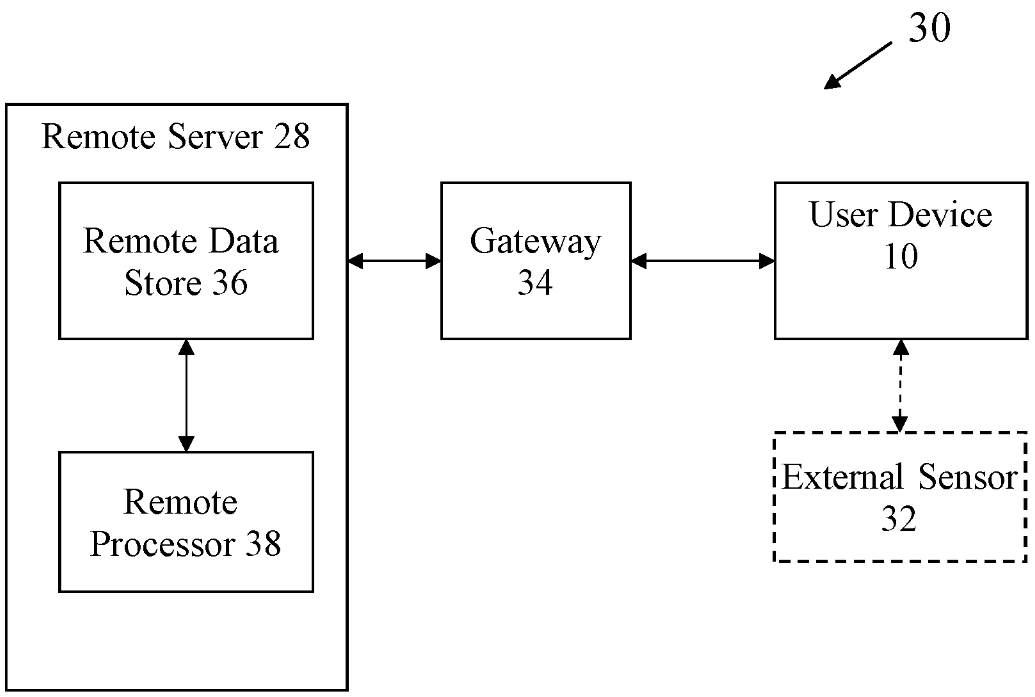
FIG. 2*a* shows a schematic view of a system for generating music using the device of FIG. 1.

FIG. 2*a* shows a block diagram of an example system for generating music/cellular composition, and is a more detailed version of the system 30 shown in FIG. 1*b*. In system 30, remote server 28 is located remote to the user device 10 and may, in embodiments, be part of a cloud computing system. The remote server 28 comprises a (remote) data store 36 which stores the available pre-recorded items of music/modules for use in a music generation/cellular composition process. The remote server 28 comprises a (remote) processor 38 or processing capabilities, to generate music/cellular compositions in response to received user data. The remote data store 36 and remote processor 38 may be located within, or otherwise be part of, the remote server 28. In embodiments, the remote data store 36 and remote processor 38 may be distinct entities that are coupled to the remote server 28.

In system 30, when a user requests music/a cellular composition to be generated, user device 10 transmits user data to the remote server 28. The user device 10 may receive user data from a sensor within the user device 10 (as described above with respect to FIG. 1*a*), and/or may receive user data from an external source such as an external sensor 32. The external sensor 32 may be, for example, a pedometer, a heart rate monitor, a fitness tracker, a satellite navigation system, etc. The user device 10 may receive user data from other external sources such as the internet. For example, the user device may receive data on the 'initial conditions' when a user requests music to be generated, such as weather data from a meteorological data website or a national weather service website (e.g. the Met Office website). In embodiments, the user device 10 may receive user data from the user herself. For example, the user of user device 10 may input user data via the interfaces of the device 10. The user data may be obtained by the user device 10 from one or more of these potential sources of data. In embodiments, when the user requests music to be generated, the user device 10 collates user data from one or more of the sources of data. For example, the user device 10 may automatically retrieve weather data by connecting to the Met Office website and obtaining weather information for the location in which the user device 10 is located. The user device 10 may poll any internal and/or external sensors (if the user device 10 detects an external sensor) and request up-to-date user data from the sensors. The user device 10 may prompt the user to input user data herself, e.g. by displaying a request on the display screen of the user device 10 or via an audible command.

The user device 10 transmits the received user data to the remote server 28 together with a request for generated music/a cellular composition. The user device 10 may communicate with the remote server using any appropriate communication protocols and techniques. For example, the user device 10 may communicate with the remote server 28 via the internet (using a wired or wireless connection to a router or gateway 34), or via a mobile network or "mobile web" (possibly by using a gateway 34 which routes data between networks using different communication protocols). The user device 10 may be able to connect to the remote server 28 using one or more techniques/protocols, and may be able to automatically switch between protocols (e.g. between a WiFi connection and a mobile web connection).

Figure 2B:
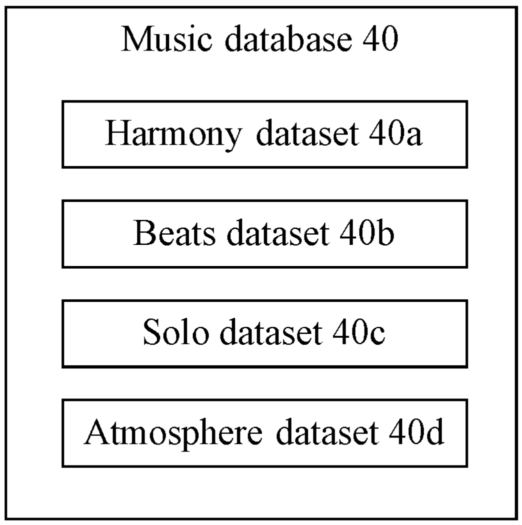
FIG. 2*b* shows a schematic view of a music dataset containing different types of pre-recorded items of music.

The remote server 28 uses the user data to select (and in embodiments, retrieve) one or more pre-recorded items of music (or modules) from the remote data store. The remote data store may comprise music datasets, such as those shown in FIG. 2*b*. In FIG. 2*b*, a data store or music dataset 40 comprises a harmony dataset 40*a*, a beats dataset 40*b*, a solo dataset 40*c* and an atmosphere dataset 40*d*. Each of these datasets 40*a* to 40*d* comprise a plurality of pre-recorded items of music (or modules). For example, the harmony dataset 40*a* comprises a plurality of pre-recorded harmonies. A harmony is usually the primary component of a musical composition/piece of music. In embodiments, a harmony is the first item of music (or module) to be selected from the music datasets to generate music/a cellular composition, and if any other items of music (or modules) are selected, they are selected based on the characteristics of the selected harmony. That is, the harmony layer of a piece of generated music is selected first and is the core audible material in the generated music, and any other layers present in the generated music are slave to/dependent on the harmony layer.

The beats dataset 40*b* comprises a plurality of pre-recorded beats, which form the pulses or extra rhythmic elements of a piece of generated music/cellular composition. (In embodiments, the solo, harmony and atmosphere layers may contain elements that have rhythmic properties, by virtue of being musical, in which case the beats layer provides an extra rhythmic element to a piece of generated music). The beat selected from the beats dataset 40*b* may be selected based on the pace or speed of the user of user device 10. For example, if a user is sensed to be walking slowly, the beat selected from the beats dataset 40*b* may be comparatively slow and may match the tempo/pace of the user's walking speed. Similarly, if the user is sensed to be running, the beat selected from the beats dataset 40*b* may have a faster tempo. The tempo (e.g. beats per minute or BPM) of the pulse/beat of the item of music selected from the beats dataset 40*b* may be proportional to the heartrate (in BPM) of the user of user device 10 or proportional to the number of strides per minute of the user (e.g. the footfall cadence, or revolutions per minute of the user). Thus, if the user data transmitted by the user device 10 to the remote server 28 comprises information about the heartrate or footfall cadence of the user, this information may be used to select an item of music from the beats dataset 40*b* with a substantially matching tempo.

The solo dataset 40*c* comprises a plurality of pre-recorded melodies. If the generated music comprises a melody, the melody is selected from the solo dataset 40*c* after the harmony has been selected from the harmony dataset 40*a*. Characteristics of the selected harmony may influence how the melody is selected. For example, if the item of music selected from the harmony dataset 40*a* is centred around the B-flat major scale, then the melody may be selected from a subset of the items of music in the solo dataset 40*c* which are in B-flat major or another complementary minor/modal key.

The atmosphere dataset 40*d* comprises a plurality of pre-recorded atmospheric sound effects and text/spoken elements. The items of music in the atmosphere dataset 40*d* may not be musical, and may comprise, for example, speech and sound effects. The atmosphere dataset 40*d* may comprise readings of poems or readings of extracts from plays, novels or speeches, for example. The atmosphere dataset 40*d* may comprise sound effects such as, for example, a recording of the "dawn chorus", the sound of rainfall or crashing waves, etc. If an item of music is selected from the atmosphere dataset 40*d* to generate/compose music, the selection may be made dependent on the user's location, the current weather, etc.

Each item of music, module and/or module set stored in music dataset 40 may be tagged or labelled so that characteristics of the item of music/module/module set can be readily identified. For example, if an item of music in the beats dataset 40*b* has a tempo of 60 beats per minute, the item of music may be tagged/labelled to indicate this particular characteristic. Similarly, if an item of music in the atmosphere dataset 40*d* comprises the sound of crashing waves, the item of music may be tagged/labelled to indicate that the item of music is appropriate if the user is located close to a body of water (e.g. by the sea or a lake). For example, if an item of music in the atmosphere dataset 40*d* comprises a reading of Wordsworth's "Daffodils" poem, the item of music may be tagged/labelled to indicate that the item of music is appropriate if the user is located in the Lake District region of the United Kingdom, and/or if the season when the user requests music to be generated is Spring. The tags may enable items of music to be selected from the music dataset 40 quickly and efficiently based on received user data. The tags may enable the music datasets to be filtered such that only those items of music which have a tag/label that corresponds to the received user data are available for use in the generated music.

Each pre-recorded item of music, or module or module set in the music dataset 40 may comprise an identifier or ID. Preferably, the identifier/ID is unique and static. The identifier may be, for example, a numeric or alphanumeric ID, or an 8-bit or 16-bit binary number. Preferably, each pre-recorded item of music is assigned an identifier when it is saved in the music dataset 40. The identifier of each pre-recorded item of music may facilitate items of music to be retrieved from the music dataset 40. The identifier of each pre-recorded item of music may enable generated music to be regenerated at a later time, as explained in more detail below.

In embodiments, the music dataset 40 shown in FIG. 2*b* may be provided within user device 10 (e.g. within data store 20). In the embodiment shown in FIG. 2*b*, the music dataset 40 may be provided within remote data store 36. In embodiments, the music dataset 40 may be provided within remote data store 36, and all or a subset of the music dataset may also be provided within user device 10.

Turning back to FIG. 2*a*, the remote server 28 uses the user data to select and retrieve one or more pre-recorded items of music (or modules) from a music dataset 40 in remote data store 36. The remote server 28 may use the user data and the labels/tags of each pre-recorded item of music in the music dataset to filter the music dataset 40. The processor 38 may then select one or more items of music from a filtered music dataset 40, which contains a subset of the available pre-recorded items of music/modules.

In embodiments, the processor 38 may select one pre-recorded item of music (module) from each of the datasets 40*a* to 40*d*, and combine these to generate music/a cellular composition. Additionally or alternatively, the processor 38 may only select an item of music from the harmony dataset 40*a* and use this to generate music. In this case, the generated music may be comprised of the selected harmony without modification. Preferably, the selected harmony may be modified to generate/compose music, e.g. by changing the key of harmony based on the direction a user is travelling in.

Additionally or alternatively, the processor 38 may select an item of music from one or more of the datasets 40*a* to 40*d*. By default, the processor 38 may select a pre-recorded item of music from each of the datasets 40*a* to 40*d*. However, if a user has provided user preferences or feedback indicating that, for example, they do not want the generated music to contain an atmosphere layer, the processor 38 may not select a pre-recorded item of music from atmosphere dataset 40*d*.

Once the processor 38 has generated the music, the remote server 28 may notify the user device 10 that the generated music is available to stream. In embodiments, the streaming may begin automatically once the processor 38 has generated music. Accordingly, user device 10 streams the generated music from remote server 28, which typically requires a continuous communication connection between the user device 10 and the remote server 28.

As explained in more detail below, the generated music may be modified in real-time based on changes in user data. For example, if a user of user device 10 switches from walking to running, the change in the user's heart rate or cadence may be used to change the tempo of the generated music. In another example, if a user of user device 10 switches from walking in one direction (e.g. due North) to walking in another direction (e.g. North West), the change in direction may be used to change the key of the harmony layer in the generated music. Changes in user data may be sent by the user device 10 to the remote server 28 every time a change is detected/received. Alternatively, the user device 10 may regularly send user data to the remote server 28 (e.g. every minute, every few minutes, every hour), whether or not the user data has changed. In this case, the user device 10 may poll any internal sensors, external sensors or any other sources of user data at regular intervals. The frequency at which the user device 10 sends user data to the remote server 28 may, in embodiments, by specified by the user of user device 10. For example, if a user wants music to be generated while they are going running or training, the user may specify that the frequency of updates is every 30 seconds because they know that their speed/cadence/heartrate will vary during their run/training. In embodiments, the user may specify the frequency depending on how user device 10 is connected to remote server 28. For example, the user may set the frequency of updates to be high (e.g. every 30 seconds) if the user device 10 is connected to the remote server 28 via a WiFi or wired internet connection, and may set the frequency to be low (e.g. every 5 minutes) if the user device 10 is connected to remote server 28 via the mobile web (to e.g. reduce usage of their mobile data allowance). The user may be able to provide this information to the user device via the interfaces 18 of the user device 10. In embodiments, the frequency at which the user device 10 sends user data to the remote server 28 may be a default frequency, e.g. every three minutes.

In embodiments, the music generation process may have more than one operation mode. For example, the music generation process may have an "active" operation mode and a "passive" operation mode. For example, the walking and running operation modes may be considered "active" operation modes, in which the generated music is generated in response to user data and changes in user data. In the "passive" operation mode, the user data may comprise user selections or user-inputted data. For example, if the music generation process is running when a user is resting or going to sleep, they may be using the "passive" operation mode in which the generated music may be generated in response to user selections and default mode-dependent rules. The passive operation mode is described in more detail with respect to FIG. 9 below.

Figure 3:
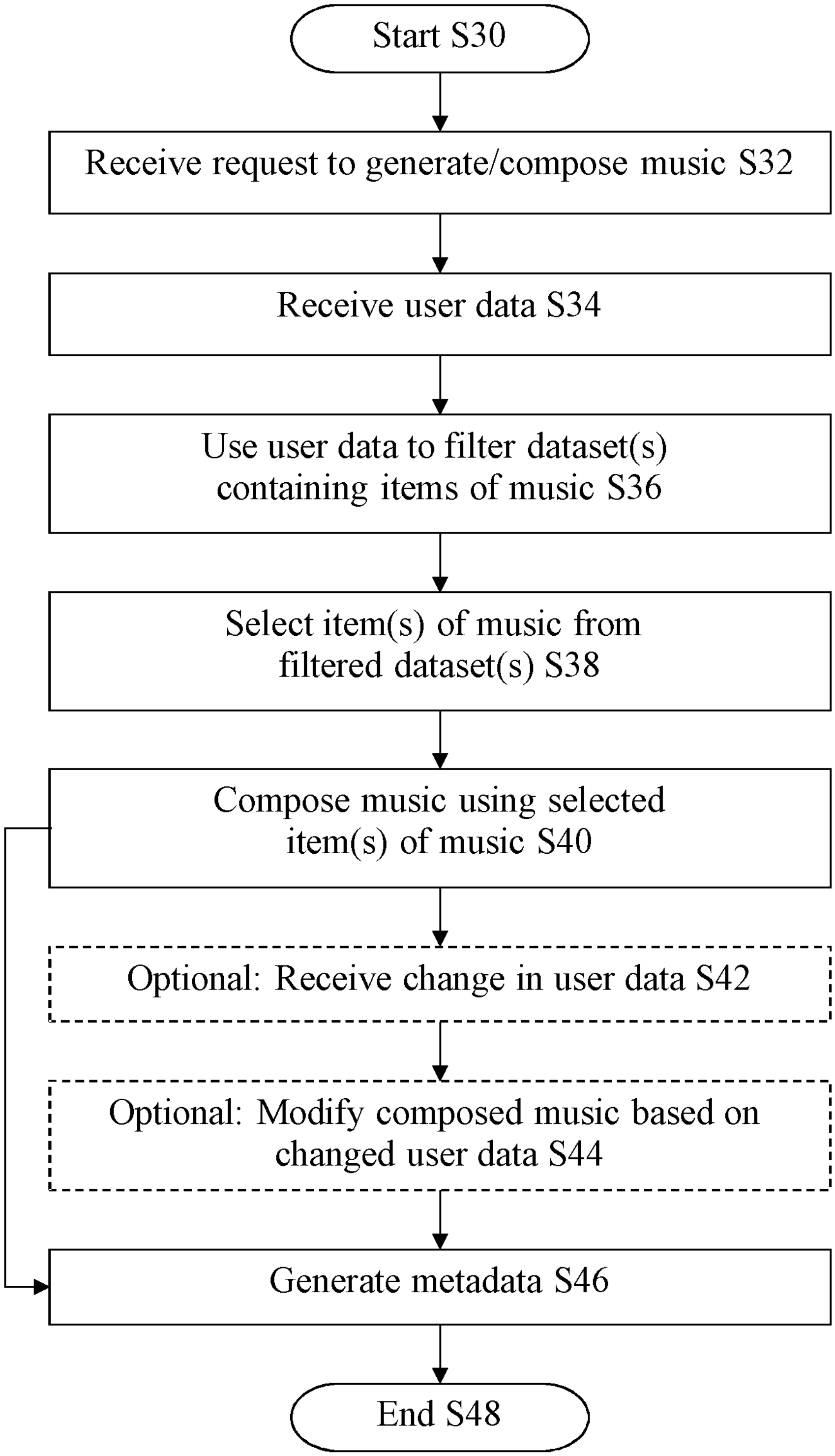
FIG. 3 shows a flowchart of example steps to compose music.

A method to generate/compose music in real-time using one or more pre-recorded items of music and based on user data is now described. FIG. 3 shows a flowchart of example steps to generate/compose music in an "active" operation mode. The method begins at start step S30, which may be when a software app used to generate/compose music is initialised. The method comprises receiving a request to generate/compose music (step S32). This may be received in response to a user pressing a physical or virtual button on their user device 10, in response to a voice command input by a user into user device 10, or otherwise.

At step S34, user data is received. The user data may be received, retrieved and/or requested, as explained above. The user data may be received by user device 10 from a sensor within the user device 10 and/or from an external source such as an external sensor (e.g. a pedometer, a heart rate monitor, a fitness tracker, a satellite navigation system, etc). The user device 10 may receive user data from other external sources such as the internet. The user device 10 may poll any internal and/or external sensors and request up-to-date user data from the sensors. Alternatively, the user data from the or each sensor may be stored in a data store in the user device when the data is received from a sensor, and at step S34 the user device may retrieve the stored user data. Additionally or alternatively, the user device 10 may prompt the user to input user data herself and at step S34 receives the user-inputted user data.

The method comprises using the received user data to filter music datasets that contain a plurality of pre-recorded items of music (step S36). As mentioned above, each pre-recorded item of music may be tagged or labelled to identify one or more characteristics of the item of music. The method comprises mapping the received user data to particular characteristics of music. For example, if the user data specifies that the user's heartrate is 120 beats per minute, the method may comprise mapping this heartrate to a particular tempo (or range of tempos). At step S36, the music datasets are filtered based on this tempo to provide a filtered dataset that contains those items of music which have a tag/label indicating they have the required tempo (or a tempo in a required range of tempos). In this example, filtering based on user heartrate may only be used to filter the beats dataset. The method may comprise consulting one or more lookup tables (or similar objects) which comprise information on how to map user data to musical characteristics. There may be a separate lookup table for each type of user data (e.g. location, heartrate, direction of travel, speed, weather, etc.) and/or for each type of musical characteristic (e.g. tempo, key, atmosphere, etc.) If the user data comprises multiple pieces of information, the method may comprise using all of the pieces of information simultaneously to filter the music dataset, or may comprise using a particular piece of information first. This is described in more detail with respect to FIG. 5.

At step S38 at least one item of music is selected from the filtered music dataset. In embodiments, one item of music is selected from each of the harmony, beats and solo datasets, and optionally from the atmosphere dataset.

At step S40, music is generated using the selected item(s) of music. In embodiments, one or more characteristics of the selected item(s) of music may be modified when generating the music. For example, the key of the selected harmony may be modified based on particular user data. In embodiments, the selected items of music are combined without modification to generate/compose music. If the music is generated in the user device 10, the generated music can be output to the user. If the music is generated in a remote server, the generated music can be delivered to a user (via the user device 10) in any number of ways, including, for example, streaming or downloading.

In embodiments, the generated music is generated until a user terminates the music generation process. Thus, the generated music could be a continuous piece of music that is a few minutes long or several hours long. The generated music may not be stored or saved (either in the user device 10 or in a remote data store). Instead, when the music generation process ends (either in response to a user termination command, or after a default or pre-defined period of time), the method comprises generating and storing metadata relating to the generated music (step S46). The metadata comprises information which enables the generated music to be re-generated at a later date. For example, the metadata may comprise the unique identifiers of each pre-recorded item of music used to generate the music, the length of the piece of generated music, the points at which the generated music was modified in response to changes in user data and how the music was modified, etc.

The user may be prompted to 'name' or otherwise label the metadata generated for each piece of generated music, so that the user can identify the generated music from the metadata alone. For example, a user may label a piece of music "running music" if it was generated while she is running. In embodiments, the default name for a piece of generated music may be formed of the date and time at which the music generation was started/ended, and possibly a user identifier (e.g. username). The metadata may be saved locally (e.g. on the user device 10), and/or in the remote server.

If the user wishes to listen to a particular piece of generated music again, she selects a particular piece of metadata from the saved list of metadata, and may then request the music associated with the selected metadata to be re-generated. The metadata enables the generated music to be regenerated. For example, a processor can extract from the metadata the unique identifiers of each pre-recorded item of music used to generate the music, and can use the identifiers to retrieve the items of music from the music dataset. The metadata preferably indicates how and when the pre-recorded items of music were combined, how and when the generated music was modified in response to changes in user data, the length of the generated music, and so on, such that the generated music can be readily regenerated. Advantageously, this may mean that generated pieces of music do not need to be stored (which reduces the memory requirements in the system), as metadata is sufficient to regenerate music as and when required. Once the metadata has been generated and saved (and optionally, named), the process ends (step S48).

Optionally, the music generation process may comprise modifying the generated music in real-time in response to changes in user data. For example, if the user's heartrate is determined to have changed (e.g. because they have switched from walking to running), the tempo of the generated music may be changed in response. Thus, optionally, at step S42, the method may comprise receiving a change in user data, and at step S44, the generated music may be modified in response to the change in user data. The method may comprise using lookup tables or other data to determine how to modify the generated music in response to the change in user data. The lookup tables may be the same as those used at step S36. Any modifications made to the generated music are incorporated into the metadata generated at step S46.

Thus, the general method for generating music comprises: receiving a request to generate/compose music; receiving user data; filtering, responsive to the received user data, at least one dataset containing a plurality of pre-recorded items of music; selecting at least one pre-recorded item of music from the filtered at least one dataset; generating music using the or each selected pre-recorded item of music; and generating metadata associated with the generated/composed music. This method may be implemented in a user device (e.g. user device 10), or aspects of the method may be distributed between a user device and a remote server (as described above with respect to FIGS. 1*b* and 2*a*).

Figure 4:
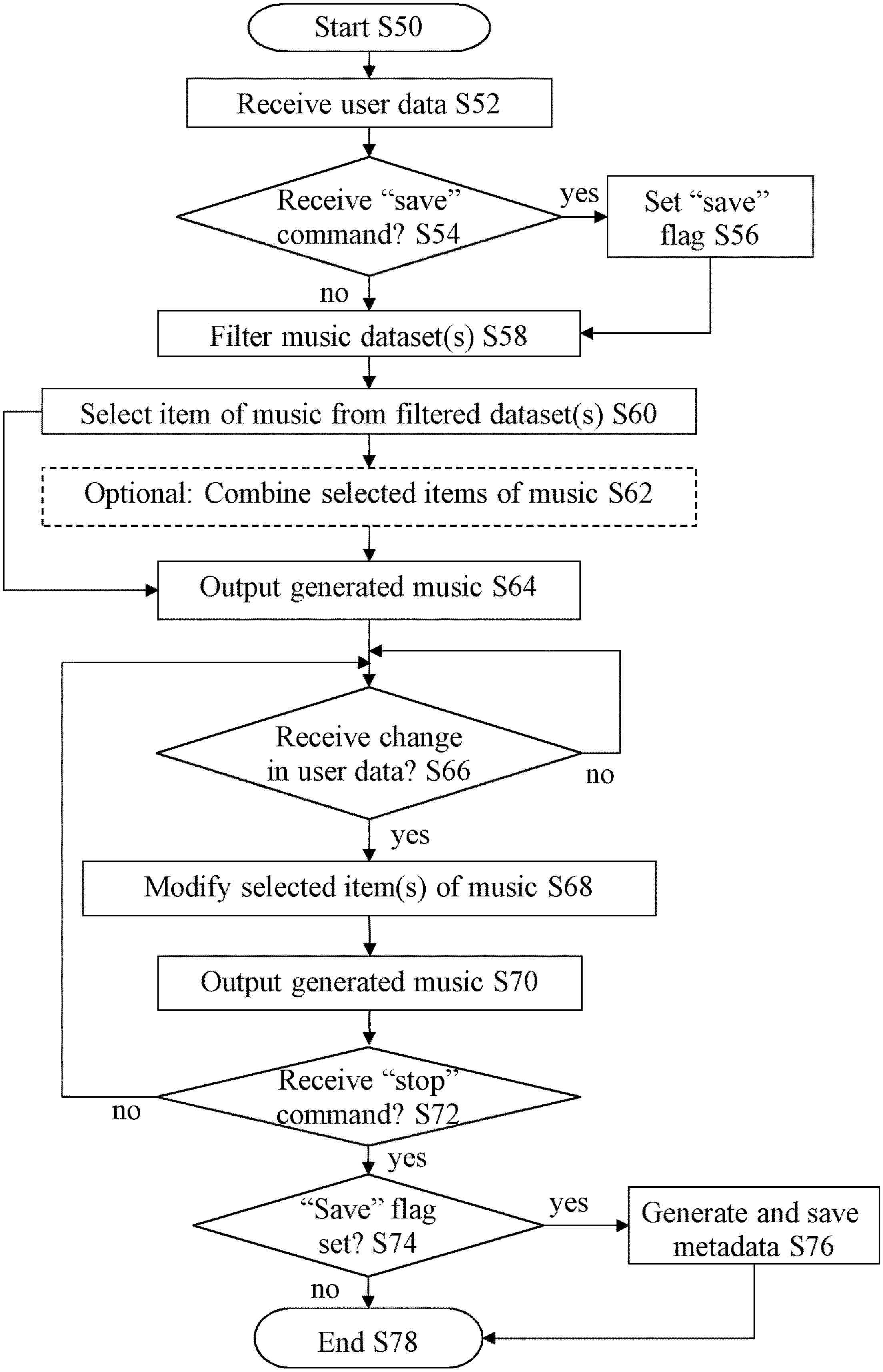
FIG. 4 shows a more detailed flowchart of example steps to compose music.

FIG. 4 shows a more detailed flowchart of example steps to generate/compose music. The method begins at start step S50, which may be when a software app used to generate/compose music is initialised and/or when a request to generate/compose music is received. At step S52, user data is received as explained above (see e.g. step S34 of FIG. 3). In the illustrated embodiment, the method comprises determining if a "save" command has been received (step S54). The method may comprise prompting the user to decide if they wish to save the music to be generated at the end of the music generation process. For example, the method may comprise displaying a prompt on a display screen of a user device that asks a user to decide if the generated music is to be saved. As mentioned earlier, the generated music may not itself be saved, but instead metadata associated with the generated music may be generated and saved. Accordingly, the prompt to "save" may be a prompt to save metadata. In embodiments, the prompt may be provided to the user at the end of the music generation process. Additionally or alternatively, the method may save metadata associated with the generated music by default (and without requiring a user to make a "save" command).

If a save command is received at step S54 (from a user or from default settings), the method comprises setting a "save" flag or other indicator/reminder to save metadata at the end of the music generation process (step S56). Following step S56, or if saving is not required, the method comprises filtering, responsive to the received user data, at least one dataset containing a plurality of pre-recorded items of music (step S58). The process to filter the music dataset(s) is similar to the process described with respect to step S36 of FIG. 3, and therefore is not repeated for the sake of conciseness. At step S60 at least one item of music is selected from the filtered music dataset(s). In embodiments, one item of music is selected from each of the harmony, beats and solo datasets, and optionally from the atmosphere dataset. If two or more items of music are selected at step S60, the method comprises combining the selected items of music (step S62). If only one item of music is selected at step S60, the method may comprise modifying the selected item of music to generate music. At step S64, the generated music is outputted. In embodiments where the music is generated in the user device 10 (e.g. as described above with respect to FIG. 1*b*), the generated music can be output to the user via the audio module 24 of the user device 10 substantially immediately after the music is generated. In embodiments where the music is generated in a remote server, the generated music may be delivered to a user (via the user device 10) in any number of ways, including, for example, streaming or downloading. In embodiments, the remote server may notify the user device 10 that the generated music is ready for streaming/downloading, or alternatively, the remote server may automatically initiate the streaming process at the user device 10.

The music generation process may comprise modifying the generated music in real-time in response to changes in user data. For example, if the user's heartrate is determined to have changed (e.g. because they have switched from walking to running), the tempo of the generated music may be changed in response. Thus, at step S66 the method may comprise checking whether a change in user data has been received. This check may be performed at regular intervals, such as every 30 seconds, every minute, or every few minutes, for example. The regular intervals may be pre-defined or may be user-defined (e.g. based on user activity). For example, if a user is exercising, the user may wish the music generation to adapt to the user's changing heartrate or activity quickly and so may define the interval at which step S66 is to be performed. If no change in user data is received the method waits the pre-defined or user-defined interval before re-checking.

If a change in user data is received, the method may comprise modifying the generated music in response to the change in user data. In particular embodiments, a change in user data may not result in the generated music being modified. For example, if a user's heart rate changes within a particular range (e.g. by +/−5 beats per minute), the tempo of the generated music may not be changed to match the change in heartrate. In embodiments, the method may comprise using lookup tables or other data to determine how to modify the generated music in response to the change in user data. The lookup tables may be the same as those used at step S58. The modified generated music is then outputted as per step S64 (step S70).

In embodiments, the method comprises checking if a command to terminate the music generation process has been received (step S72). In embodiments, the music generation process may automatically terminate after a pre-determined period of time, and/or if no change in user data is received in a pre-determined period of time. If no "stop" or termination command has been received, the method may comprise looping back to check if any changes in user data have been received. If a stop command is received, the method may comprise checking if a "save" flag has been set (step S74). If the "save" flag has been set, the method comprises generating metadata associated with the generated music (step S76), in a manner similar to that described with respect to step S46 of FIG. 3. Following step S76, or if no "save" flag is set, the music generation process then terminates (step S78).

The method shown in FIG. 4 and described above may be implemented in a user device (e.g. user device 10). Additionally or alternatively, particular steps of the method may be distributed between a user device and a remote server. For example, at step S52, the user data may be received at a user device or at a remote server (from a user device). Similarly, at step S64, the step to output generated music may be performed at a user device, or may be performed at a remote server which indicates to a user device that the generated music is ready to stream.

Figure 5:
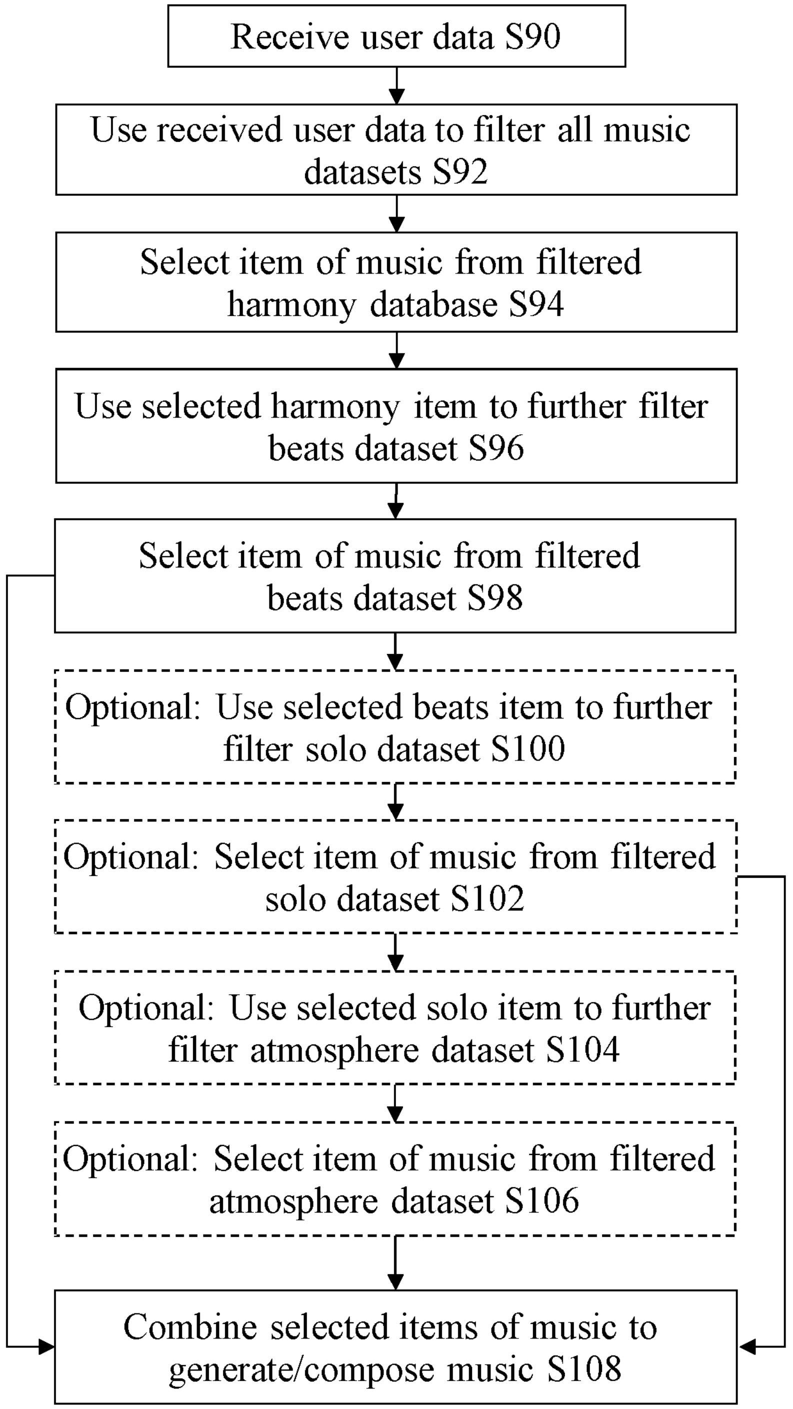
FIG. 5 shows a flowchart of example steps to select items of music to compose music.

As mentioned above, the generated music is composed of at least one pre-recorded item of music selected from a music dataset. FIG. 5 shows a flowchart of example steps to select pre-recorded items of music to generate/compose music. At step S90, the method to select items of music for use in the generated music comprises receiving user data. In the illustrated embodiment, the music dataset comprises a harmony dataset, a beats dataset, a solo dataset and an atmosphere dataset, which are described above with respect to FIG. 2*b*.

The method comprises using the received user data to filter all of the music datasets 40*a* to 40*d* (step S92). This may be performed even if an item of music is not selected from every dataset 40*a* to 40*d*. The filtering at step S92 may be considered a high-level filter or a coarse filter. The technique to perform this coarse filtering may be that described with respect to step S36 of FIG. 3 above, and is therefore not repeated for the sake of conciseness. As the harmony is usually the primary component of a musical composition/piece of music, the harmony layer is the first item of music to be selected from the music datasets to generate/compose music. Thus, at step S94 an item of music is selected from the filtered harmony dataset. In embodiments, the selection of the harmony item of music may be random and performed by the processor (in the user device or in a remote server). In embodiments, the selection of the harmony item of music may be in response to a user indication of what type of harmony they require. This is described in more detail below with respect to FIG. 9.

The selection of a harmony item of music triggers further filtering of the music datasets. In the illustrated embodiment, the next item of music to be selected from the music dataset is a beats item of music. Thus, at step S96, the method comprises using the selected harmony item to further filter the beats dataset 40*b*. The beats dataset 40*b* has been filtered once (at step S92) based on user data, and is now further filtered based on one or more characteristics of the selected harmony item of music. For example, the selected harmony item of music may be better suited to a particular type of beat or a particular tempo, and these suitability criteria may be used to further filter the beats dataset. Thus, the further filtering of the beats dataset (and other datasets) is performed so that items of music which are best suited to the harmony are selectable. This further filtering may be considered a fine filter with respect to the filtering performed at step S92. An item of music is selected from the further filtered beats dataset 40*b* (step S98). In embodiments, only a harmony layer and a beats layer are used to generate/compose music, and in this case, the selected items of music are combined at step S108 to generate/compose music.

In embodiments, an item of music may be selected from the solo dataset 40*c* and used in addition to the harmony and beats layers to generate/compose music. in this case, at step S100, the selected beats item of music may be used to further filter the solo dataset 40*c*. In embodiments, one or both of the selected beats item of music and the harmony item of music may be used to further filter the solo dataset 40*c*. The solo dataset 40*c* has been filtered once (at step S92) based on user data, and is now further filtered based on one or more characteristics of the selected harmony item of music and/or selected beats item of music. For example, the selected items of music may be better suited to a particular type of melody, and any such suitability criteria may be used to further filter the solo dataset. For example, if the item of music selected from the harmony dataset 40*a* is centred around a B-flat major scale, then the melody may be selected from a subset of the items of music in the solo dataset 40*c* which are in B-flat major or another complementary minor/modal key. Thus, the further filtering of the solo dataset is performed so that items of music which are best suited to the harmony and/or beats are selectable. This further filtering may be considered a fine filter with respect to the filtering performed at step S92. An item of music is selected from the further filtered solo dataset 40*c* (step S102). In embodiments, only a harmony layer, a beats layer and a solo layer are used to generate/compose music, and in this case, the selected items of music are combined at step S108 to generate/compose music.

Optionally, an item of music may be selected from the atmosphere dataset 40*d* and used in addition to the harmony, beats and solo layers to generate/compose music. in this case, at step S104, one or more of the selected items of music may be used to further filter the atmosphere dataset 40*d*. An item of music is selected from the further filtered atmosphere dataset 40*d* (step S106) and the selected items of music are combined at step S108 to generate/compose music.

It will be understood that it is not essential to perform the filtering of the music datasets in the order shown in FIG. 5. In embodiments, the selected harmony item of music may be used to filter the solo dataset instead of the beats dataset. Furthermore, in embodiments, the generated music may be composed of an item of music from some or all of the four music datasets 40*a* to 40*d*. In embodiments, the choice of a particular item of music from one music dataset may not result in finer filtering of one or more of the remaining datasets. For example, the choice of the beats item of music may not impact which atmosphere items of music can be used to generate/compose music.

The further, finer filtering of each dataset may be performed in a similar manner to the initial coarse filtering of all datasets. That is, the method may comprise consulting one or more lookup tables (or similar objects) which comprise information on how to use the musical characteristics of the selected item(s) of music to further filter the music datasets. The tag/label of an item of music may be used to perform the further filtering process. For example, a tag/label of an item of music may identify particular characteristics of the item of music, and the further filtering process may involve filtering for particular characteristics. Additionally or alternatively, a tag/label of an item of music may indicate suitability with specific items of music.

Figure 6:
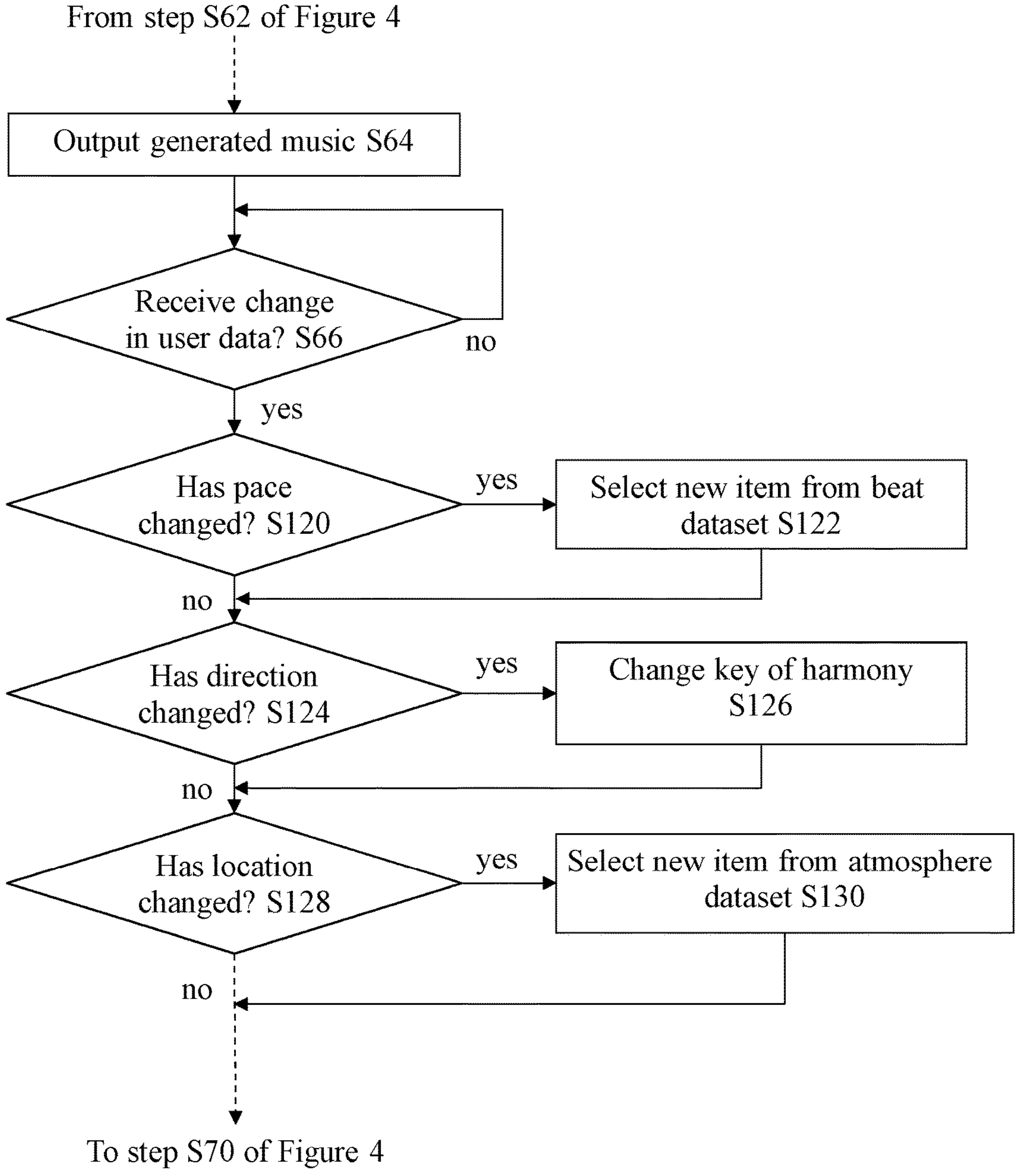
FIG. 6 shows a flowchart of example steps to compose music in response to a user walking or running.
Figure 7:
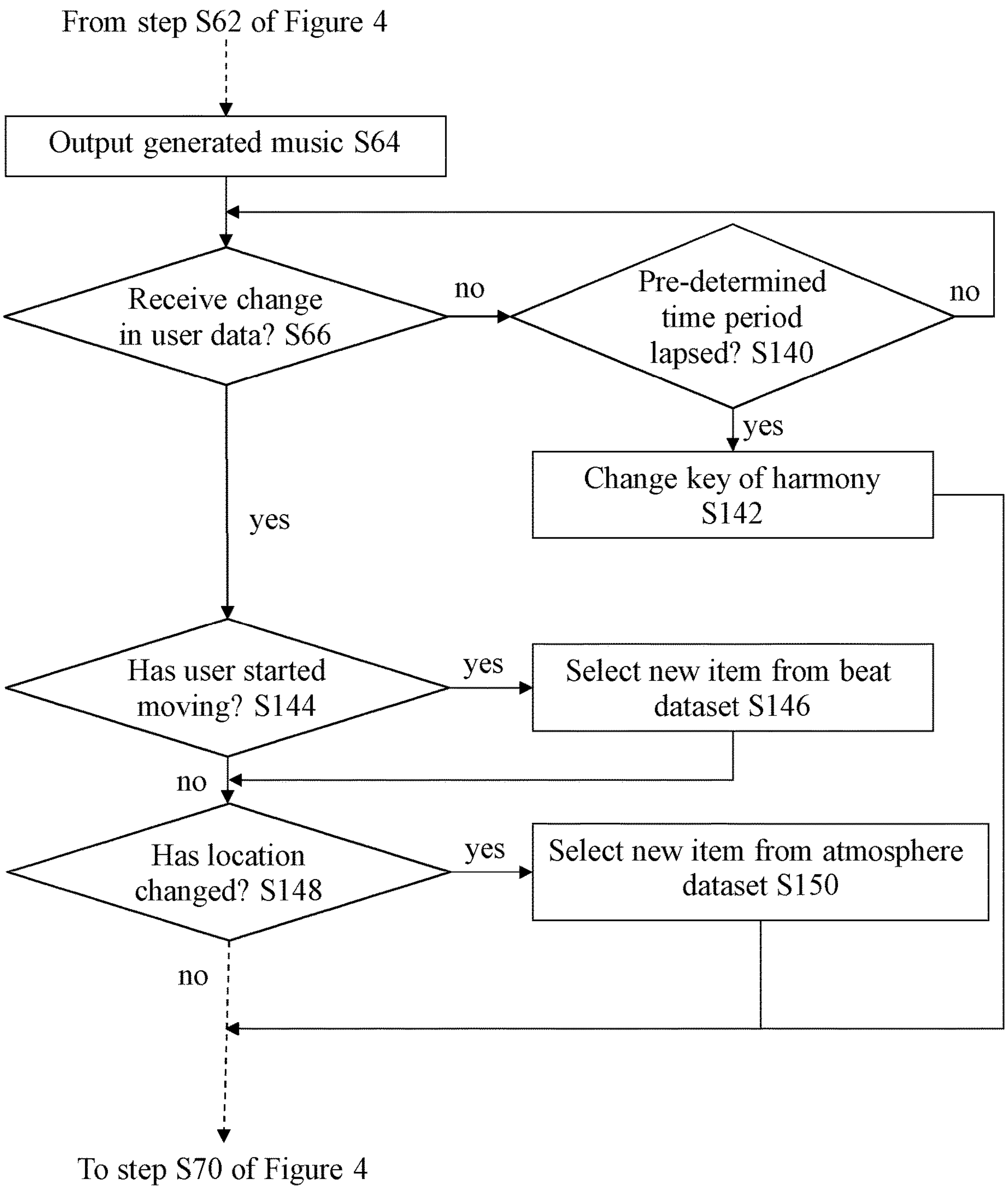
FIG. 7 shows a flowchart of example steps to compose music in response to a user sitting or resting.
Figure 8:
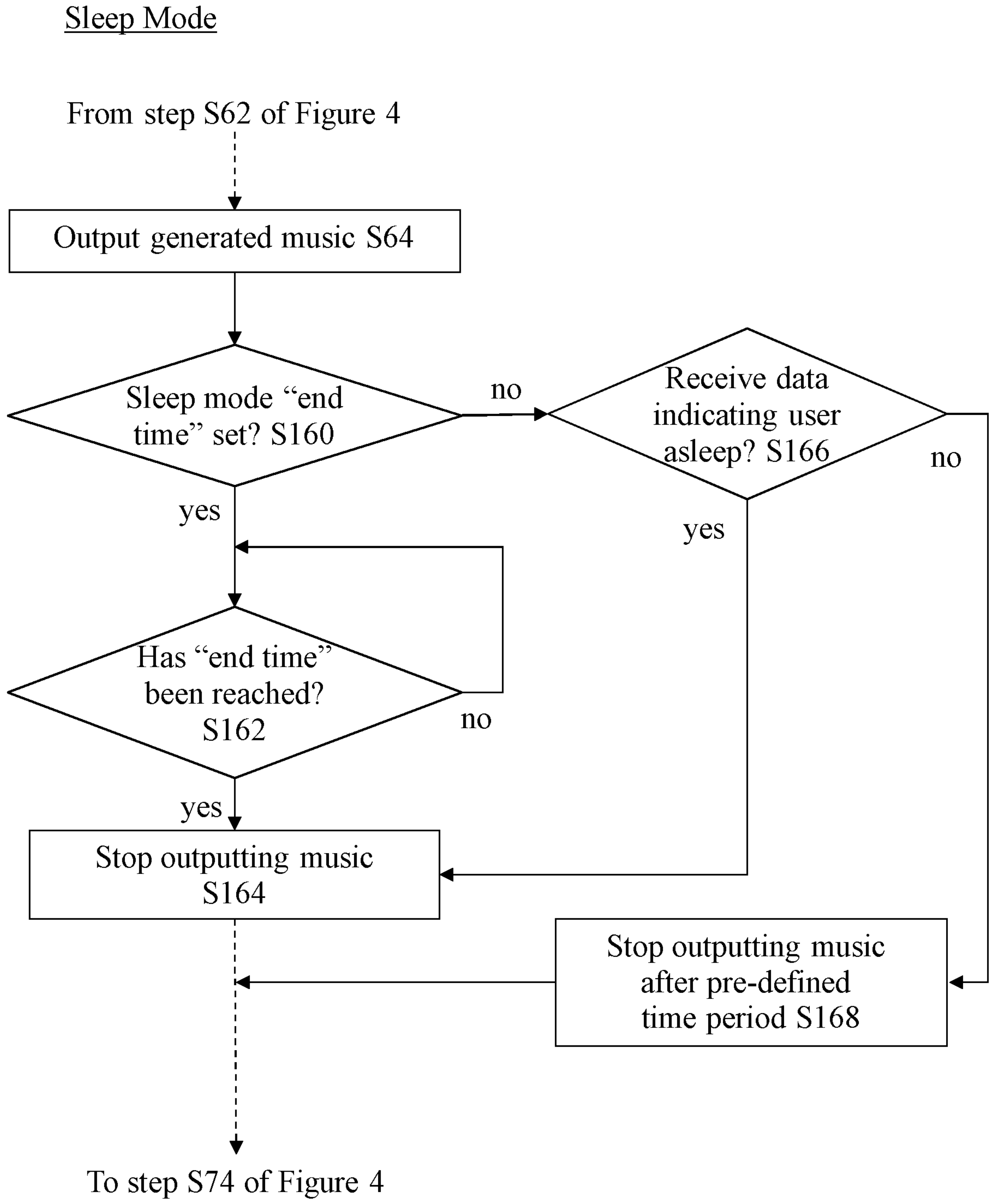
FIG. 8 shows a flowchart of example steps to compose music in a sleep mode.

The music generation process may vary depending on user activity, and in embodiments, it may be possible to specify user activity to tailor the music generation process. FIGS. 6, 7 and 8 show, respectively, variations in the general music generation process (of FIG. 4) based on whether a user is walking/running, sitting/resting, or falling asleep. These are just some possible operation modes, and there may be other operation modes possible which impact the music generation process.

Turning now to FIG. 6, this shows a flowchart of example steps to generate/compose music in response to a user walking or running. When a user requests music to be generated, the user may also be able to select an "operation mode". In this case, the user has selected a walking or running mode. The music generation process is substantially the same as that described with respect to FIG. 4 up until step S66. In walking/running mode, at step S66 of the process, the method comprises checking whether a change in user data has been received. This check may be performed at regular intervals, such as every 30 seconds, every minute, or every few minutes, for example. The regular intervals may be pre-defined for the operation mode or may be user-defined (e.g. based on user activity). For example, in walking/running mode, the user may wish the music generation to adapt to the user's changing heartrate or activity quickly and so the default interval at which step S66 is performed in the walking/running operation mode may be shorter (i.e. more frequent) than in other operation modes. If no change in user data is received, the method waits the pre-defined or user-defined interval before re-checking.

If a change in user data is received, the method may comprise determining what type of change has been received. For example, the method may comprise determining if the received changed user data indicates that the user's pace has changed (step S120). The pace may be indicated by cadence, heartrate, or by determining how quickly a user has covered a particular distance, for example. This data may be obtained from a sensor in the user device and/or external to the user device. If the user's pace has changed, the method may determine whether the pace has increased or decreased, and/or by how much the pace has changed relative to the original user data. If the pace has changed by a significant amount, the method may comprise selecting a new item from the beats dataset which better matches/suits the new pace of the user (step S122). In embodiments, the tempo of the existing generated music is simply changed (e.g. increased or decreased) in response to the change in the user's pace. In embodiments, the modification at step S122 is only made if the change in pace is outside of a pre-defined error range. For example, the pre-defined error range for heartrate may be +/−5 beats per minute, such that a change in heartrate by up to 5 beats per minute is not considered significant enough to warrant modification of the beat/tempo of the generated music.

The method may comprise determining if the direction in which a user is travelling has changed (step S124). A change in direction of travel may cause the key of the generated music to be modified. The method may comprise consulting a lookup table to determine how the change in direction causes a change in key of the generated music.

Figure 11:
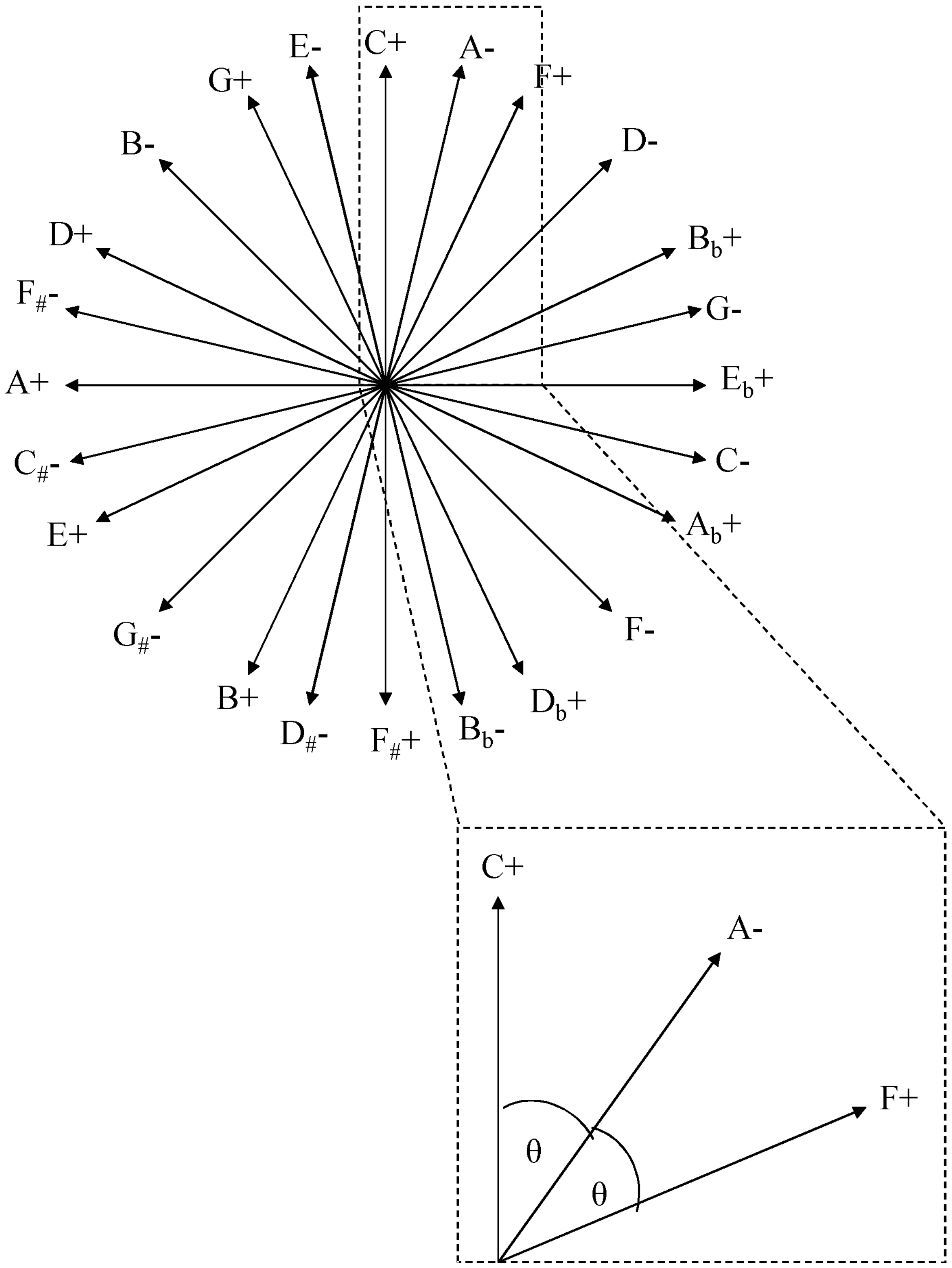
FIG. 11 is a schematic diagram showing how a change in a user's direction of motion causes a change in key in the composed music.

FIG. 11 shows a schematic diagram showing how a change in a user's direction of motion may cause a pre-defined change in key in the generated music. Each cardinal direction (North, East, South, West) and intermediate (ordinal) directions may be associated with a particular key. For example, travelling due North may be associated with the C major key, while travelling South may be associated with the F sharp major key. The twenty-four possible keys (12 minor and 12 major) may each be associated with a particular cardinal direction of travel, e.g. North, Northwest, South-south-east, etc. In embodiments, as shown in FIG. 11, each of the 24 keys may be associated with a particular angle or direction of travel and may be separated by the same angle θ from their neighbours (e.g. by 15°). In embodiments, the 24 keys may not be associated with the cardinal/ordinal directions and instead, the user's initial direction of travel may define a 'virtual North', and all other directions and key changes are defined relative to the initial direction of travel. In embodiments, the angular separation between neighbouring directions of travel may not be equal/uniform. For example, there may be a larger angular separation between particular directions/keys, so that, for example particular key changes only take place if the direction of travel has changed significantly.

Turning back to FIG. 6, the method may comprise determining the angle by which the user's direction of travel has changed, and using this to determine how to modify the key of the generated music. For example, based on the example in FIG. 11, if a user's direction changes relative to an original direction of travel (which corresponds to C major) by an angle θ in the clockwise direction, the key of the generated music may change to A minor. In the user's direction changes relative to an original direction of travel by an angle 2θ in the anticlockwise direction (or −2θ), the key of the generated music may change to G major. Subsequent changes in direction may be determined relative to the original direction of travel or to the previous direction of travel. Thus, at step S126 in FIG. 6, the determined change in direction is used to modify the key of the harmony layer of the generated music (or the overall key of the generated music). In embodiments, if the change in key of the harmony layer means one or more of the other layers in the generated music are no longer suited to the harmony layer, step S126 may comprise selected other suitable layers (i.e. other more suitable items of music from the beats, solo and/or atmosphere datasets).

The method may comprise determining if the location of the user has changed (step S128). A change in location may prompt a new item of music to be selected from the atmosphere dataset, or for the existing (if any) atmosphere item of music to be removed from the generated music (step S130). As mentioned earlier, the atmosphere item of music may be selected based on a user's location, and/or the user's proximity to notable places, places of interest, etc. For example, if the user is determined to now be walking/running past the Globe Theatre in London (UK), the new item of music selected from the atmosphere dataset at step S130 may be a reading of a passage from a play or poem by Shakespeare.

FIG. 6 merely shows some possible ways the generated music may be modified based on changes in user data. The order of steps S120 to S128 is merely exemplary, and additional or alternative steps may be taken to modify the generated music. After the generated music has been modified (or it has been determined that no modification is required), the music generation process returns to step S70 of FIG. 4.

FIG. 7 shows a flowchart of example steps to generate/compose music in response to a user sitting or resting. In this case, the user has selected a sitting/resting operation mode. The music generation process is substantially the same as that described with respect to FIG. 4 up until step S66. In the sitting/resting mode, at step S66 of the process, the method comprises checking whether a change in user data has been received. This check may be performed at regular intervals, such as every 30 seconds, every minute, or every few minutes, for example. The regular intervals may be pre-defined for the operation mode or may be user-defined (e.g. based on user activity). For example, in sitting mode, the default interval at which step S66 is performed may be longer (i.e. less frequent) than in the running operation mode. If no change in user data is received at step S66, the method waits the pre-defined or user-defined interval before re-checking.

If a change in user data is received, the method may comprise determining if the user has started moving i.e. is no longer sitting/resting (step S144). If so, a new item may be selected from the beats dataset which better matches/suits the new pace of the user (step S146). In embodiments, the tempo of the existing generated music is simply changed (e.g. increased or decreased) in response to the change in the user's pace. In embodiments, the modification at step S146 is only made if the change in pace is outside of a pre-defined error range, as explained earlier. Small changes in motion (e.g. a user shuffling in their seat), or infrequent changes in motion (e.g. if a user walks around a room for a few moments only) may not be considered significant enough to change the beat or tempo of the generated music. Thus, prolonged changes in motion may be used, in particular embodiments, to determine that a user is moving and that the beat/tempo may need to be modified.

In embodiments, the method may comprise determining if the user's location has changed. A user's location may change if the user has started moving. In embodiments, the user may still be resting/sitting but their location may have changed if, for example, they are in a moving vehicle (e.g. a train, car, plane, etc). In any case, a change in location may prompt a new item of music to be selected from the atmosphere dataset, or for the existing (if any) atmosphere item of music to be removed from the generated music (step S150), in a similar manner to that described above with respect to FIG. 6.

In embodiments, if no change in user data is received at step S66, the method may comprise checking if a pre-determined time period has lapsed since user data (or changes in user data) were last received (step S140). The pre-determined time period may be a few minutes, 30 minutes, an hour, etc. If the pre-determined time period has not lapsed, the method returns to step S66. If the pre-determined time period has lapsed, the method may comprise automatically modifying the generated music in a pre-determined way (step S142). For example, the method may comprise automatically modifying a key of the harmony layer. As mentioned earlier, changing the key of the harmony layer may also require making changes to other layers in the generated music. Thus, the music generation process is configured to automatically modify the generated music in the sitting/resting mode even if no changes in user data are received, in order to introduce variations in the generated music. The process then continues on to step S70 of FIG. 4.

FIG. 8 shows a flowchart of example steps to generate/compose music in a sleep mode. In this case, the user has selected a sleep operation mode. The sleep mode may be selected if a user wishes to listen to music to help them relax, to meditate, or to fall asleep. Thus, in this operation mode it may be desirable to terminate the music generation process after some time so that the user is able to fall asleep or stay asleep. The music generation process is substantially the same as that described with respect to FIG. 4 up until step S64. In the sleep mode, the method may comprise determining if an "end time" has been set by a user (step S160). When the user selects sleep mode, they may be prompted to specify how long they would like music to be generated for before the music generation process terminates. A user may specify an end time (e.g. 23:30) or time duration (e.g. 30 minutes), or may select an end time/time duration from a list of options. Alternatively, the user may ignore this prompt and may decide to either terminate the music generation process manually, or allow user data indicating the user has fallen asleep to determine when the music generation process terminates.

If at step S160 it is determined that an end time has been specified/set, the method may comprise checking if that end time has been reached (step S162). If the end time has been reached, the method comprises stopping the output of the generated music (step S164) and then the process proceeds to step S74 of FIG. 4. If the end time has not been reached, the method returns to step S162.

If at step S160 it is determined that no end time has been specified/set, the method may comprise determining if data indicating that the user is asleep has been received (step S166). The user may be wearing a heartrate monitor, fitness tracker, or sleep monitoring device, which may be able to determine if a user has fallen asleep (e.g. if the user's heartrate falls below a resting heartrate). If such data is received at step S166, the method comprises stopping the output of the generated music (step S164). If no such data is received at step S166, the method may comprise automatically stopping the output of generated music after a pre-defined time period (step S168). For example, the method may comprise automatically stopping the output of generated music after 45 minutes, or after 60 minutes. In embodiments, step S166 may comprise displaying a prompt on the user device asking the user if they wish to continue receiving generated music. If a response from the user is received, the method may comprise continuing or discontinuing the music generation based on the user's response. If no response from the user is received, the method may determine that the user is asleep and may proceed to step S164.

In the sleep mode, if the output of the generated music is to be stopped, the method may comprise slowly fading-out the generated music instead of abruptly stopping the music, since an abrupt change may startle or wake-up the user.

Figure 9:
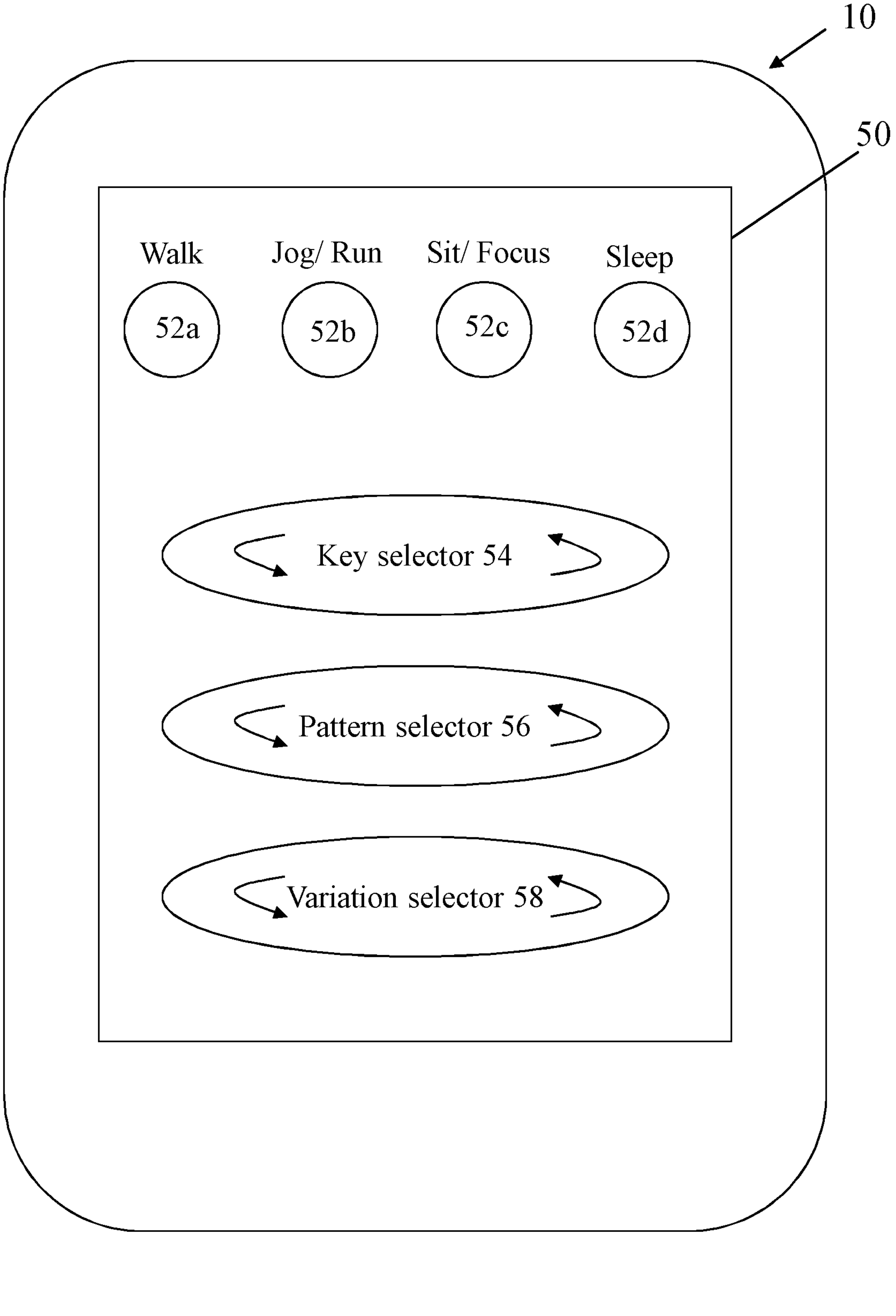
FIG. 9 shows a schematic diagram of a user interface on the device of FIG. 1 for generating music.

FIG. 9 shows a schematic diagram of a graphical user interface of user device 10 used for generating music. User device 10 may comprise a display screen 50, which may, in embodiments, be a touch screen. The display screen 50 may be used to display/present a graphical user interface (GUI) when the user launches the 'app' to generate/compose music. The example GUI shown in FIG. 9 comprises operation mode buttons 52*a* to 52*d*, which enable a user to select a walking mode (button 52*a*), a jogging/running mode (button 52*b*), a sitting/focus/relaxing mode (button 52*c*), or a sleep mode (button 52*d*). The number and type of operation modes, and corresponding buttons on the GUI, may vary. In embodiments, once the user has selected a particular operation mode, user data may be used by the processor (in the user device 10 or in a remote server), to select appropriate items of music from the music datasets. The selected operation mode may also cause certain pre-defined and mode-dependent rules to be applied. For example, if a user selects the sleep mode, the changes in key applied to the harmony layer may be defined by a mode-dependent rule, which may specify particular calming key changes (e.g. from D major to G major). Similarly, if a user has selected the walking or running mode, the possible changes in key may be defined by a mode-dependent rule, which may permit more abrupt/dramatic changes in key.

In embodiments, the user data may comprise user selections or user-inputted data. This may be useful when the music generation process is in a "passive" operation mode. For example, the walking and running operation modes may be considered "active" operation modes, in which the generated music is generated in response to user data and changes in user data. The sleep and rest modes may be considered "passive" operation modes, in which the generated music may be generated in response to user selections and default mode-dependent rules. In embodiments, the sleep and rest modes may be "active" operation modes as the generated music may also be generated in response to user data, together with default mode-dependent rules.

In a passive operation mode, the GUI shown in FIG. 9 may enable a user to make user selections which are used (in addition to, or instead of, user data) to generate/compose music. The GUI may comprise further buttons which the user may use to make selections regarding the music to be generated. In a particular embodiment, the GUI may enable a user to make a pseudo-random selection of a harmony item of music. This may be useful when in the "passive" operation mode (e.g. when a user is static), to prevent or minimise the chance that the same items of music are selected by default each time the music generation process is in the "passive" mode. Further layers of music may be selected and combined based on the selected harmony item of music, as described above.

The GUI may comprise a key selector 54, a pattern selector 56 and/or a variation selector 58. The key selector 54 enables a user to select one of the twenty-four possible musical keys. The key selector 54 may cycle through the twenty-four keys and when the user presses the key selector 54 button on the GUI, the key selector selects the key it is cycling through at that time. The key selector 54 may play each key to the user while it is cycling through the keys, or may display the key (e.g. A−, F+, F #+, etc.), or alternatively, may not provide any aural or visual indication of the keys as it cycles through the possible keys. When the user uses the key selector 54 to select a key, the key selector 54 may provide an aural output to indicate which key has been selected. The user may, in embodiments, be able to spin the key selector 54 again to select a different key if they did not like the original selection.

The pattern selector 56 enables a user to select a pattern. Patterns are different types of oscillation, gestures and figurations within and around a root key (i.e. the selected key). For example, a guitar player can play gently strummed chords, arpeggios, or faded in and out sounds to represent a chord. Such patterns also apply to larger musical ensembles, including orchestras. Thus, the patterns may comprise sounds played on a single instrument in the selected key, sounds played by a complete orchestra in the selected key, or sounds played by other combinations of instruments in the selected key. Thus, the pattern selector 56 may cycle through various patterns based around the key selected using the key selector 54, and in a similar way to the process described above for the key selector, the user may be able to select a particular pattern using the pattern selector 56.

The variation selector 58 enables a user to select a variation of the selected pattern. A variation is a musical technique in which material is repeated in an altered form. The alterations may involve changes to one or more of: the harmony, melody, rhythm, timbre, orchestration. For example, if the selected pattern oscillates from the lowest notes of a chord to the highest, and back again, a variation may contain no violins, or it may only contain a piano, or it may be performed by violas plucking their strings (pizzicato) instead of being played with a bow. Thus, the variation selector 58 may cycle through a plurality of variations based around the pattern selected using the pattern selector 56, and in a similar way to the process described above for the key selector, the user may be able to select a particular variation using the variation selector 58.

Each of the selectors may be presented as spin wheels or dials, which may automatically begin rotating once a user has selected the passive operation mode, and which may be stopped by the user to enable a pseudo-random selection of the harmony item of music. For example, the key selector 54 may cycle through all twenty-four musical keys and a user may press the key selector 54 to select a particular key. Once a key has been selected, the pattern selector 56 may cycle through the textural variations of the selected key. There may be any number of textural variations available for each key. Once a pattern has been selected, the variation selector 58 may cycle through variations based on the chosen pattern. There may be any number of variations available for each pattern. Thus, using all three selectors results in a harmony item of music being pseudo-randomly selected by a user. Further items of music may be selected from the datasets to generate/compose music, based on the selected harmony item, as described above.

Figure 10:
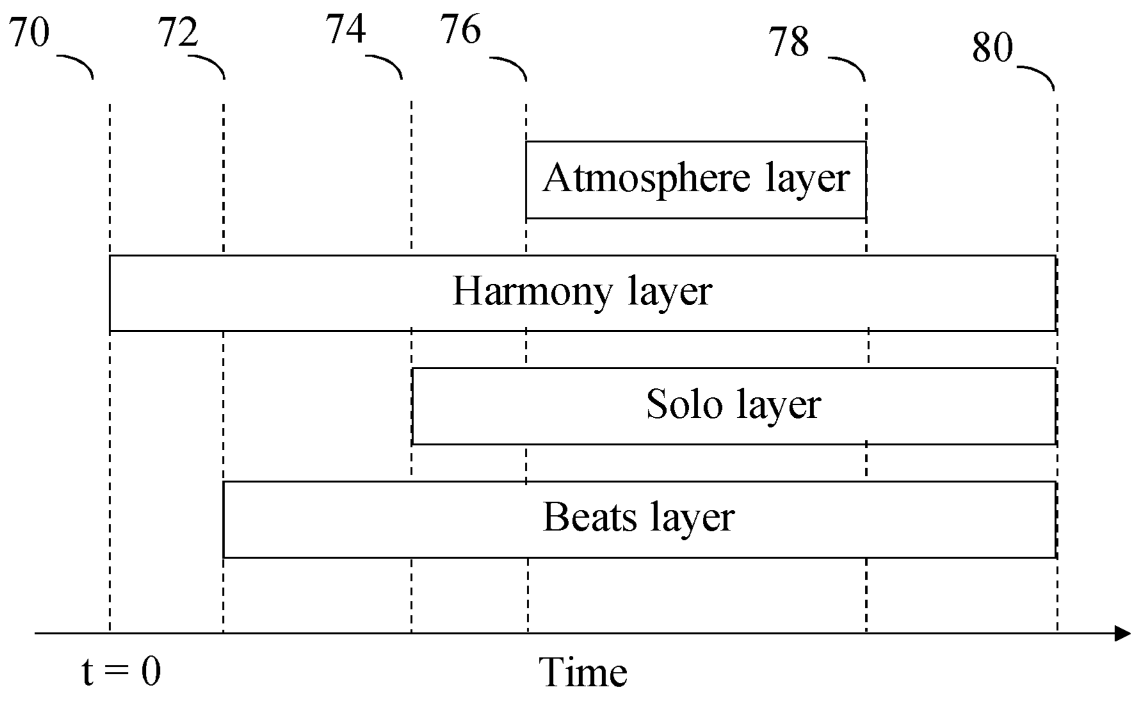
FIG. 10 is a schematic diagram showing an example of how items of music are combined to compose music.

FIG. 10 is a schematic diagram showing an example of how items of music may be combined to generate/compose music. As mentioned earlier, the harmony item of music (or harmony layer) may be selected first in the music generation process. In embodiments, each layer may be present within the generated music at the same time. Additionally or alternatively, the harmony layer may be present through the generated music and the other layers may appear and disappear over time in the generated music. At point 70 (time t=0), the harmony layer has been begun in the generated music. At point 72, the beats layer begins to appear in the generated music, and at point 74, the solo layer begins to appear in the generated music. At point 74 and thereafter, the harmony, solo and beats layer are all present in the generated music. At point 76, the atmosphere layer appears in the generated music, and at point 78 the atmosphere layer disappears from the generated music (e.g. in response to a change in user data, or otherwise). Thus, between point 76 and point 78, all four layers are present within the generated music, and from point 78 to point 80 (when the music generation process terminates), only three layers are present in the generated music. The times at which each layer is added and removed from the generated music is recorded in the metadata associated with the generated music, as explained earlier.

Figure 12:
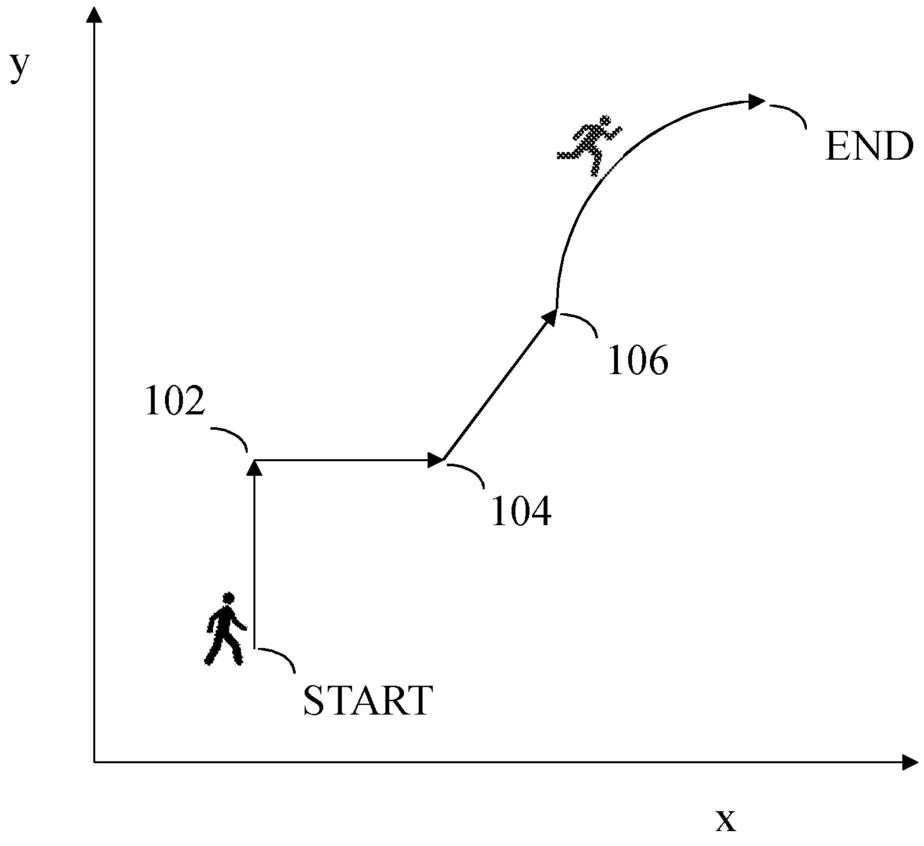
FIG. 12 is a schematic diagram showing how changes in a user's motion cause changes in the composed music.

FIG. 12 is a schematic diagram showing how changes in a user's motion (i.e. user data) may cause changes in the generated music. A user may make a request for generated music and then begins to go on a walk. The user walks in an initial direction. At point 102, the user changes her direction of travel. The change in direction of travel may cause a change in key of the generated music, as explained above with reference to FIG. 6. At point 104, the user changes her direction of travel again, and this may again cause a change in key of the generated music. At point 106, the user starts running. The change in speed of the user (or heartrate) may be used to cause a corresponding change in the tempo or beat of generated music, as described with reference to FIG. 6. During this run, the user's direction also changes. Depending on how quickly the user's direction changes, the key of the generated music may or may not be changed. The key may only be changed if a direction of travel is maintained for a particular amount of time, e.g. 30 seconds, or a few minutes. The user then terminates the music generation process (at END) and metadata associated with the generated music may be generated and stored.

Figure 13:
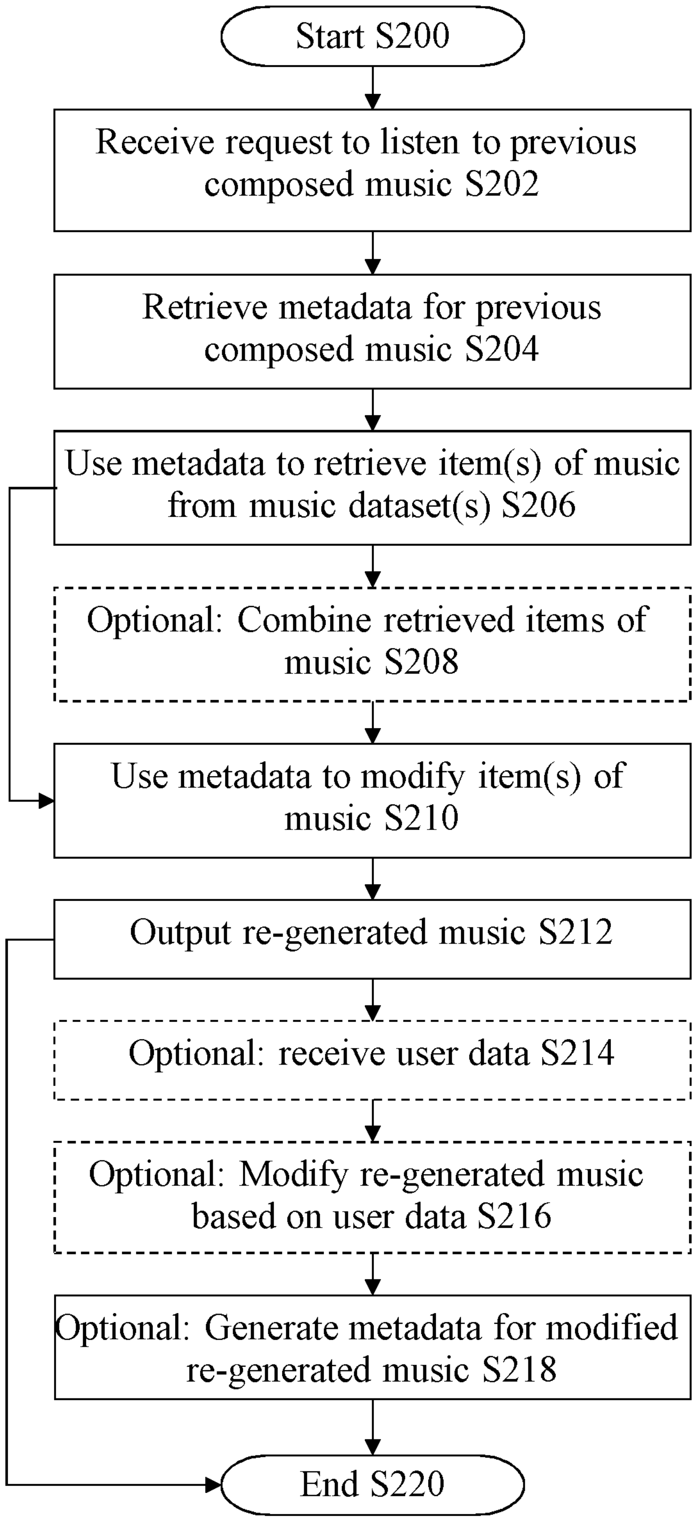
FIG. 13 is a flowchart of example steps to re-compose previously composed music.

FIG. 13 is a flowchart of example steps to re-generate/re-compose previously generated/composed music. As explained above, metadata may enable a piece of generated music to be regenerated. The method to regenerate music begins at start step S200. The method comprises receiving a request to listen to/replay a previously generated piece of music. The request may be obtained via the user interface of a user device. The user may be able to access a list of available pieces of generated music, based on the metadata that has been created and stored, and the user may select a particular piece of generated music from the list for regeneration. At step S204 the method comprises retrieving metadata associated with the selected generated music. This step may be performed by the processor in the user device or by the remote server/remote processor. The metadata may be stored locally (i.e. in the user device) or remote to the user device (e.g. in a remote data store). The method may comprise retrieving, using the metadata, the or each pre-recorded item of music which forms the generated music from the at least one music dataset (step S206). If multiple items of music formed the generated music, at step S208, the items of music are combined in accordance with the metadata.

If the generated music was modified over time, e.g. in response to changes in user data, the modifications and when they occur in the generated music are recorded in the metadata. Thus, the method comprises modifying, using the metadata, the or each retrieved pre-recorded item of music (step S210), and then regenerating the generated music and outputting the result (step S212). In embodiments, once the original generated music has been regenerated and outputted, the process ends at step S220.

In embodiments, it may be possible for the user to modify the regenerated music to create new generated music. If, while the regenerated music is playing/outputted, user data is received (step S214), the method may optionally comprise modifying the regenerated music based on the received user data (step S216), and thereby creating new generated music. The method may comprise generating metadata for the new/modified regenerated music (step S218) in the same way as described earlier.

In embodiments, the user may be required to pay for previously generated music to be re-generated, i.e. to pay to 'listen again' to previously generated music. In embodiments, listening to re-generated music may not require the user to make a payment.

The user may, in embodiments, be able to purchase an item of generated music, so that she may listen to the generated music as often as she likes and without needing to re-generate the music each time. Thus, in the process described with respect to FIG. 13, the user may be presented with an option to purchase the previously generated music (e.g. between step S202 and step S204, or before the music is re-generated, or during/after the re-generated music is being/has been outputted). Purchasing the item of generated music may mean the user is able to download a copy of the generated music which is playable without requiring the re-generation process to be performed.

Figure 14:
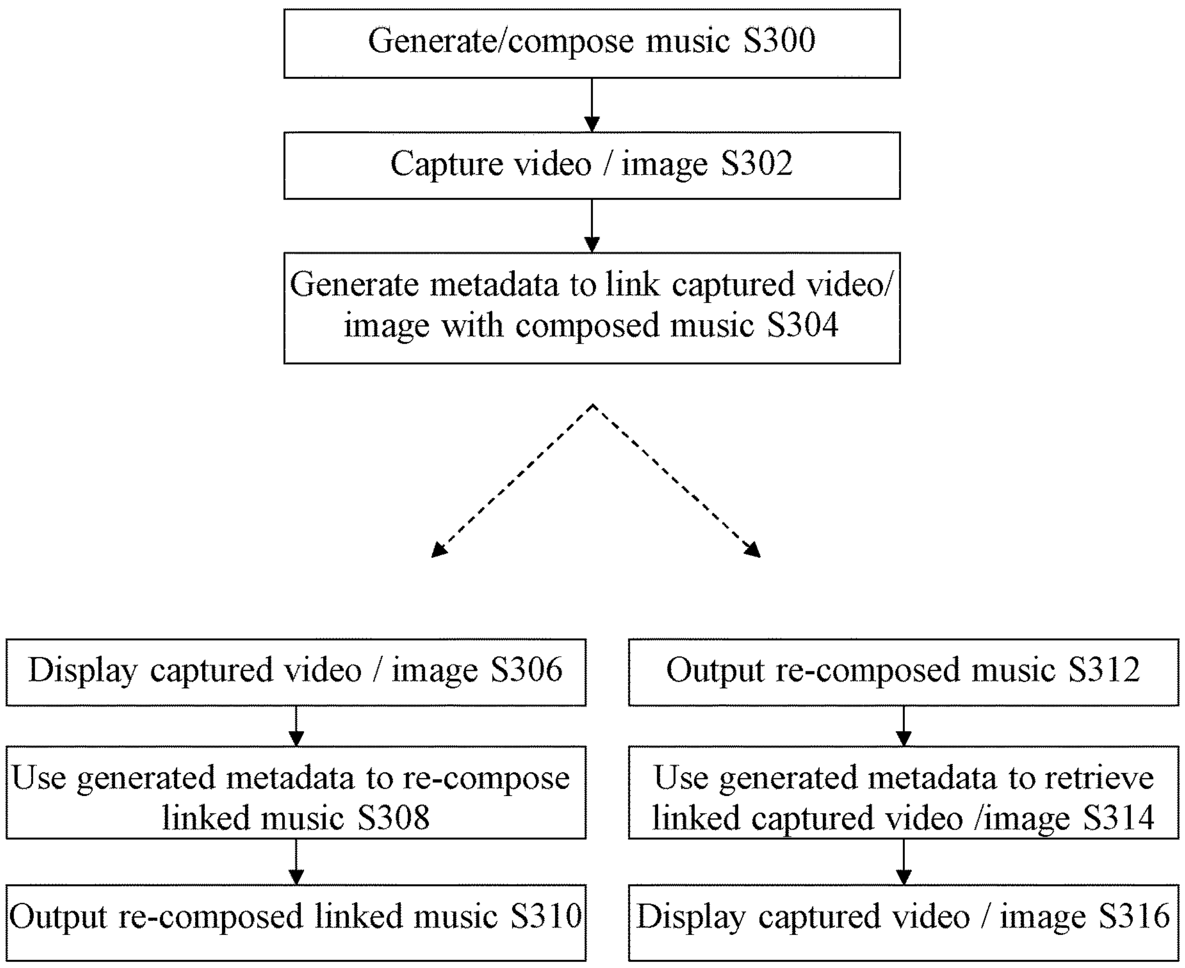
FIG. 14 is a flowchart of example steps to link a captured image with a piece of composed music.

FIG. 14 is a flowchart of example steps to link a captured image with a piece of generated music. In embodiments, music is generated (step S300), and a user may use an image capture device (e.g. a camera, or a smartphone comprising a camera, or a webcam, etc.) to take pictures and/or record video while music is being generated (S302). The user device may receive the captured image/video from the image capture device while the music is being generated and outputted. The method comprises generating metadata or otherwise creating a link between the captured image and the generated music (step S304). The metadata or link may be associated with the generated music, the captured image/video, or both.

At some point in the future after the music generation process of step S300 has ended, the user may view the captured image/video. The captured image/video may be displayed on the user device (S306). In embodiments where the image/video comprises the metadata or link to associate the image to the generated music, the method comprises using the metadata/link to regenerate the generated music that is associated with the image. The regeneration process is similar to that described with respect to FIG. 13. The method may comprise outputting the regenerated music while the user is viewing the image/video (step S310).

Additionally or alternatively, at some point in the future after the music generation process of step S300 has ended, the user may request a piece of generated music to be regenerated. If the generated music (which is to be regenerated) comprises metadata or a link to associate the music to an image/video, the method may comprise using the metadata to retrieve the associated image/video (step S314) and displaying the associated image/video (step S316) while the regenerated music is being outputted.

Figure 15:
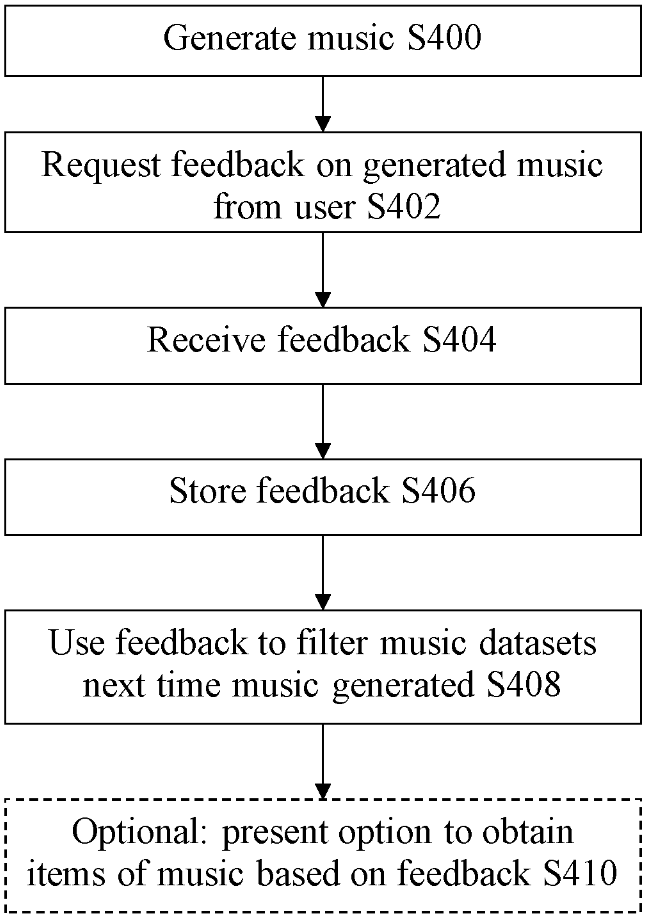
FIG. 15 is a flowchart of example steps to obtain user feedback on composed music.

FIG. 15 is a flowchart of example steps to obtain user feedback on generated music. The method begins by generating music (step S400) using any of the methods described above. When the music generation process has been terminated, the method comprises requesting feedback from the user on the generated music (step S402). The feedback may be requested by displaying a prompt or pop-up on the user device display screen, or via an email to the user, or otherwise. The user may be able to provide feedback on a piece of generated music immediately after the music has been generated, or some time afterwards. The user may be able to provide various different types of feedback. For example, the user may be able rate the generated music, or to indicate which features of the generated music he liked or disliked. For example, the user may be able to indicate that he enjoyed the harmony layer, but did not enjoy the beats layer, or he may be able to specify that he liked/disliked a particular modification made to the generated music in response to a change in user data. The method comprises receiving feedback data (step S404), and storing the received feedback data (step S406). The feedback data may be stored locally, or preferably, is stored in a remote data store in association with the user's account or user profile.

Preferably, the feedback data is used the next time a user requests music to be generated (step S408). The feedback data may be used to filter the music datasets when generating the music (e.g. to remove particular types of beats based on her dislikes). Optionally, the feedback data may be used to present the user with the option to obtain access to/purchase additional "layer packs" (step S410). For example, if a user indicates that they enjoyed a particular type of harmony, the feedback data may be used to give the user the option of accessing similar types of harmonies. If the user purchases additional "layer packs", the user may have access to additional pre-recorded items of music in the remote data store, or may be able to download the additional pre-recorded items of music, for use in future music generation.

Artificial intelligence and machine learning techniques may be used to learn a user's likes and dislikes, and to filter the music datasets when generating music to improve the chance that the user is provided with generated music that they will like. Machine learning techniques may use the feedback data provided by the user to tailor the music generation process to each individual user, and/or may use other 'implicit' types of feedback provided by the user. Implicit feedback may be provided by a user, for example, when the user requests the music generation process to restart/start again after only a short period of listening to a piece of generated music. This may suggest that the user dislikes the piece of generated music and wants the process to start again. Another example of implicit feedback is if a user discards a selection. For example, in the pseudo-random selection process described above with respect to FIG. 9, if a user discards a key selected using the key selector 54 (i.e. by requesting the key selector 54 to start cycling through the keys again), the user may be implicitly indicating that they disliked the original selected key.

As mentioned above, the music generation process may use the time of day as input to generate/compose and modify the generated/composed music. For example, music with a faster tempo may be generated during the day, or when a user is walking/running, while music with a slower tempo may be generated in the evening, or when a user is relaxing. However, a user who works at night may prefer the generated music to have a faster tempo during the night and a slower tempo during the day. If a user repeatedly rejects a particular selected beat and prefers a faster/slower beat tempo, they may be implicitly providing information about their work patterns or lifestyle. Machine learning techniques may be used to understand a user's habits, work and exercise patterns as well as their likes and dislikes, to generate music the user is more likely to enjoy.

As mentioned above, each pre-recorded item of music in the music datasets may comprise a tag or label. A tag or label may also be appended to an item of music to indicate the artists/musicians who created, composed and/or performed the item of music. For example, a guitar solo performed by Jack White may be tagged with "Jack White", a reading of a poem performed by Patrick Stewart may be tagged with "Patrick Stewart", and an item of harmony music performed by the Royal Philharmonic Orchestra may be tagged with "Royal Philharmonic Orchestra" or with the individual names of the members of the orchestra who performed the music. These labels may be used to filter the music datasets, particularly in response to user feedback or user preferences (input by the user or determined via machine learning techniques) for particular artists/musicians, or to provide users with the option of purchasing "layer packs" containing more pre-recorded items of music created or performed by their preferred artists/musicians.

The tags/labels may be used as part of an artist/musician compensation scheme. For example, the tags/labels may be used to determine how often a particular artist's item of music has been used to generate/compose music and to compensate the artist accordingly.

Figure 16:
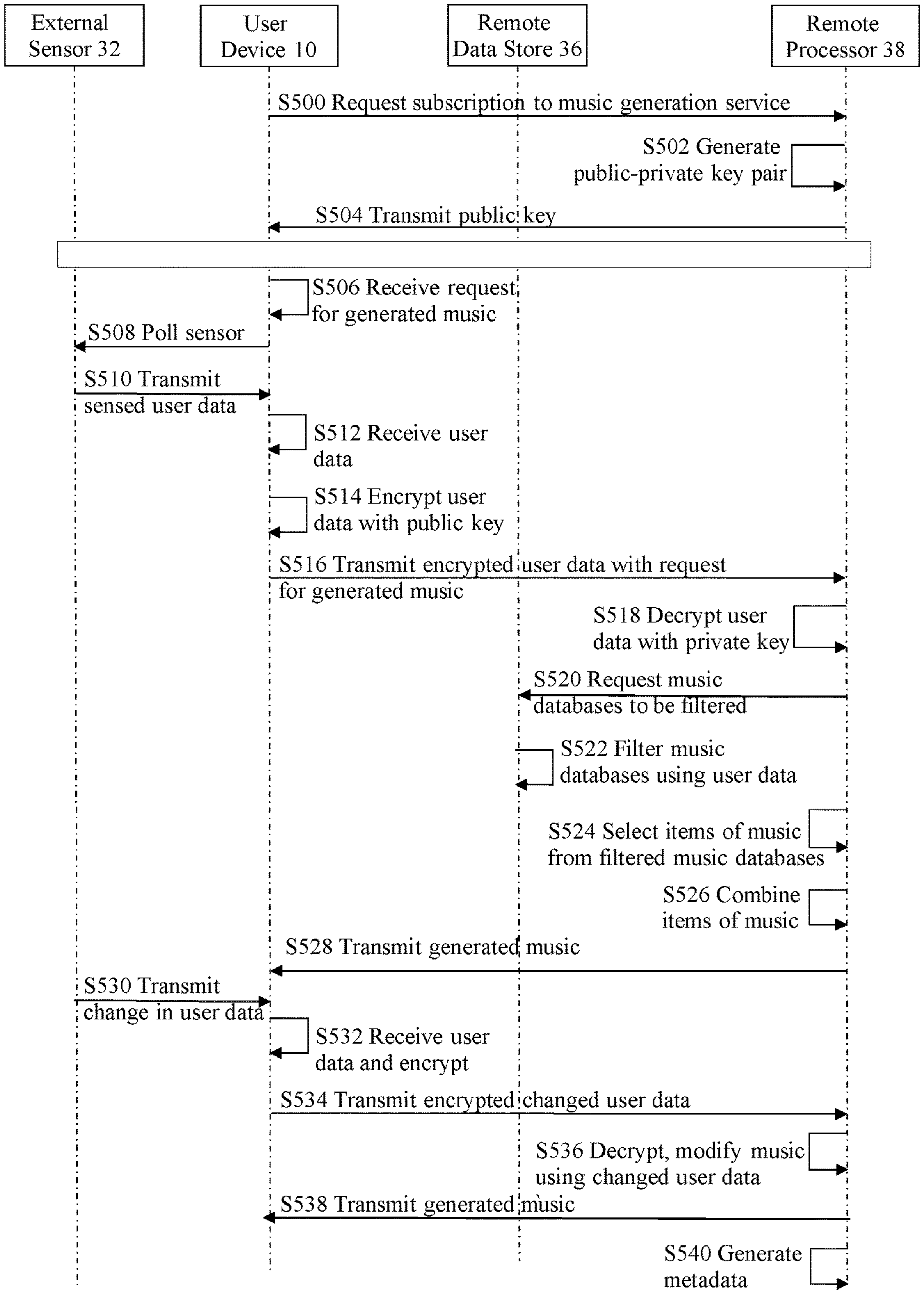
FIG. 16 shows a schematic diagram of the steps to compose music in a music generation system.

As mentioned earlier, all or part of the music generation process may be performed in a remote server rather than on a user device. FIG. 16 shows a schematic diagram of the steps to generate/compose music in a music generation system in which steps of the music generation process may be distributed across various devices. The music generation system is similar to the system 30 shown in FIG. 2*a*. The system comprises a remote server 28 which is located remote to a user device 10 and may, in embodiments, be part of a cloud computing system. The remote server comprises a (remote) data store 36 which stores the available pre-recorded items of music for use in a music generation process. The remote server comprises a (remote) processor 38 or processing capabilities, to generate/compose music in response to received user data. The remote data store 36 and remote processor 38 may be located within, or otherwise be part of, the remote server. In embodiments, the remote data store 36 and remote processor 38 may be distinct entities that are coupled to the remote server.

In order for a user (and a user device 10) to access a music generation service, the user/user device 10 may need to register with the music generation service. At step S500, the user sends a subscription request to the music generation service using her user device 10. The user may only need to register with the music generation service once, not per user device. The subscription/registration request is received by the remote processor 38. Since the music generation process uses user data to generate/compose music, it is important to enable secure communications between the user device and remote server, so that user data is not accessible by malicious third parties. This is particularly important since the user data could comprise real-time information on the precise location of the user, as well as biometric data, etc. Thus, as part of the registration process, the remote processor 38 may generate a public-private key pair to enable communications between the user device 10 and the remote server to be encrypted (step S502). The remote processor 38 sends a confirmation to the user device 10 of the registration and also transmits the public key of the public-private key pair to the user device 10. (The private key is known only to the remote server/remote processor 38). The user device 10 may be configured to store the public key and use it to encrypt all data sent to the remote server when requesting music to be generated.

The music generation process begins when a user makes a request for generated music. At step S506, the user device receives a request for generated music. In embodiments, the user device 10 may need to obtain user data for use in the music generation process. Thus, in embodiments, the user device may poll one or more sensors (step S508) to obtain user data. In FIG. 16, the sensor is shown as being an external sensor 32, but the sensor could be within the user device 10 itself. At step S510, the external sensor 32 transmits sensed user data back to the user device, and at step S512 the user device 10 receives user data. The user data received at step S512 may comprise user data received from one or more sources, including the external sensor 32, any internal sensor(s), the internet, the user herself, and so on. At step S514, the user device 10 encrypts the received user data with the public key, and then at step S516 transmits the encrypted user data with the request for generated music. The user device 10 may communicate with the remote server using any appropriate communication protocols and techniques. For example, the user device 10 may communicate with the remote server via the internet (using a wired or wireless connection to a router or gateway), or via a mobile network or "mobile web".

The remote processor 38 receives the transmission from the user device and decrypts the user data using the private key of the public-private key pair (step S518). The remote processor requests the music datasets of the remote server to be filtered (step S520), and the remote data store 36 filters the music datasets using the user data (step S522) as described above. The remote processor 38 selects one or more items of music from the filtered music datasets (step S524) as described earlier. If multiple items of music are selected, at step S526 the remote processor 38 combines the selected items of music and generates music. At step S528, the remote processor 38 may transmit the generated music to the user device 10, or may indicate to the user device 10 that the generated music is available to be streamed from the remote server. In embodiments, the streaming may begin automatically once the processor 38 has begun generating music. Accordingly, user device 10 may stream the generated music from the remote server, which typically requires a continuous communication connection between the user device 10 and the remote server.

The generated music may be modified in real-time based on changes in user data. Changes in user data may be sent by the user device 10 to the remote server every time a change is detected/received. Alternatively, the user device 10 may regularly send user data to the remote server (e.g. every minute, every few minutes, every hour), whether or not the user data has changed. In this case, the user device 10 may poll any internal sensors, external sensors or any other sources of user data at regular intervals.

At step S530, the external sensor 32 sends updated user data to the user device 10, either automatically or in response to a poll/query from the user device 10. The user device receives the changed user data and encrypts the data (step S532), and then transmits the changed user data to the remote processor (step S534). The remote processor 38 receives the changed user data, decrypts the data and uses the data to determine whether to modify the generated music, and if so, how to modify the generated music. The modified generated music is provided to the user device at step S538, in a similar way to step S528.

When the user terminates the music generation process, the user device 10 may send the termination request to the remote processor 38. In response, the remote processor 38 terminates the music generation process and may generate and store metadata (step S540) as described earlier. The metadata may be stored in association with the user's profile/account in the music generation service.

Figure 17:
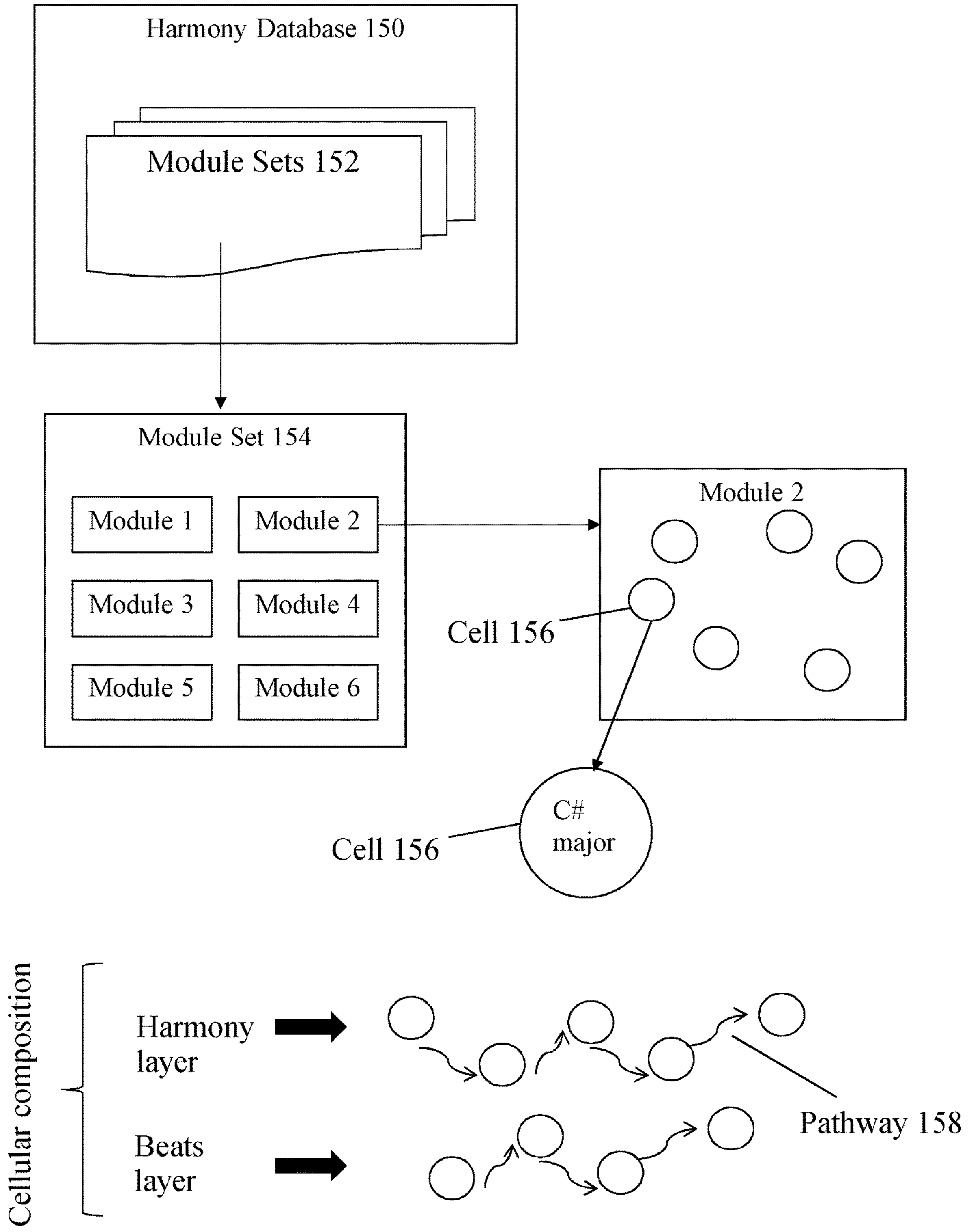
FIG. 17 shows a schematic diagram of components of a cellular composition.

As mentioned above, in embodiments a cellular composition may be formed from one or more modules depending on user data. FIG. 17 shows a schematic diagram of components of a cellular composition. Generally speaking, a cellular composition may comprise multiple musical layers, for example one or more of: a harmony layer, a beats layer, a solo layer, and an atmosphere layer. FIG. 17 shows a cellular composition formed of two musical layers, for the sake of simplicity. In embodiments, a cellular composition may be composed from cells selected from one or more of: a harmony dataset, a beats dataset, a solo dataset, and an atmosphere dataset. As shown in FIG. 17, each dataset, such as harmony dataset 150, comprises a plurality of module sets 152. A module set of the plurality of module sets 152, such as module set 154, comprises a plurality of modules 1-6. (There is no restriction on the number of modules within a module set, and module sets may contain the same or different numbers of modules). A module, such as module 2, comprises a plurality of cells 156. A cell is a short musical motif or phrase with a harmony and internal patterns, similar to an ostinato. Each cell 156 within module 154 may have the same motif but with a different key or chord. Each cell has a number of properties. The cell properties are used to select a cell that matches user preferences or user data/actions. For example, the properties may include information on complexity, texture, mood, tempo, etc. Each cell is also linked to/related to at least one other cell—each relationship to another cell is defined in a cell's properties. This relationship may be indicative of a cell's musical similarity or complementarity to another cell, and may be used to select cells that can blend together to form a composition that is pleasing to hear. (Cells which are very musically different to each other may result in jarring compositions, because the sound may change drastically).

As shown in FIG. 17, one cell may have a harmony in C # major, while other cells may be in D major, B minor, F # major, B flat minor, etc. A module set, such as module set 154, comprises modules which are closely related, i.e. they have similar characteristics. For example, the modules 1-6 within module set 154 may have the same harmonic characteristics but different textures. Module sets may be very different to each other, such that switching between module sets causes a significant change in the cellular composition.

To form a cellular composition, an apparatus (e.g. a user device 10, a remote server 28 or a music production component 302) filters the music datasets based on user preferences or user data/action. The apparatus may select a cell 156 from at least one dataset (e.g. harmony dataset) which has properties that substantially match the user preferences/data. Any other cells used to form the harmony layer or to form other layers of the cellular composition (e.g. the beats layer) are selected based on the relationships of the first selected cell to other cells. For example, the selected harmony cell may be related to another harmony cell within the same module, and may be related to other cells in other modules or module sets, and may be related to other cells in other datasets (e.g. beats dataset). The relations are used to select cells to form the cellular composition. When selected, the cells of each layer are arranged according to a pathway 158. The pathway 158 indicates the progression from one cell to another cell in the cellular composition. The pathway may specify whether any individual cell is to loop/repeat before the next cell is introduced into the cellular composition. The pathway of each layer may at least partly overlap. By default, each cell 156 may be looped or repeated within the cellular composition. That is, the cellular composition may be formed of the same cell being repeated. In the absence of any change in user data, the same cell may be repeated for a certain duration before the cell is replaced with a new cell (from the same module) in the cellular composition. The cell transitions in the absence of any change in user data may be based on predetermined transition rules. The transition rules may specify, for example, which cell follows another cell to form a pathway. Accordingly, the apparatus may arrange the plurality of cells according to a default pathway, to form the cellular composition.

Changes in user data may cause changes in the cellular composition. The type of change and/or the magnitude of the change may be used to determine how the cellular composition is changed. For example, the cellular composition may be modified by first determining, for each change in user data, a change type and a change magnitude, and then identifying, responsive to the determining, at least one transition rule corresponding to each change in user data, before applying the at least one transition rule. Larger changes in user data (e.g. large changes in user speed or heart rate or direction of motion) may cause larger changes to the cellular composition than smaller changes in user data. For example, when a user begins exercising, the user's heart rate will likely increase significantly. This may cause a large change to the cellular composition, e.g. a change in module set (i.e. a change in harmony). A change in module set may be the most drastic change to the cellular composition. The smallest change to a cellular composition may be to simply switch to a new cell within a module (i.e. a change in key/chord). This type of change may be implemented if, for example, no change in user data is received after a specific duration has lapsed. A small change such a key/chord change may be implemented if the change in user data is small and frequent so, that small, frequent changes do not cause drastic changes to cellular compositions, which could be unpleasant to listen to. For example, an 'idle' to walking transition may occur frequently during a day when a user stops to open doors, stops to cross a road, gets up from her desk to walk to the printer or kitchen, etc. Thus, generally speaking, large changes in user data cause significant/dramatic changes to the cellular composition, and vice versa.

In embodiments, a cellular composition is formed of at least a harmony layer. Changes to user data may cause changes to the harmony layer, i.e. for cells within the harmony layer to be transitioned. Due to the relations between cells, changes to the cells in the harmony layer may automatically cause changes to the cells in any other layers, e.g. the beats layer.

Cells may be different lengths. For example, one harmony cell may be two measures long, while another harmony cell may be three measures long. Similarly, cells from different datasets may be different lengths, even if there is a relation between them. For example, a harmony cell that is two measures long may be related to a beats cell that is two measures long, and another beats cell that is three measures long. Cells may be looped/repeated different numbers of times, e.g. one harmony cell may be repeated once, another may be repeated four times. The differences in cell length/duration and repetition may mean that when a harmony cell is close to being transitioned to another harmony cell, the underlying beats cell is not close to being transitioned. However, as the harmony cells may, in embodiments, dictate transitions of cells in other layers, all cells may be transitioned when a harmony cell is transitioned.

Figure 18:
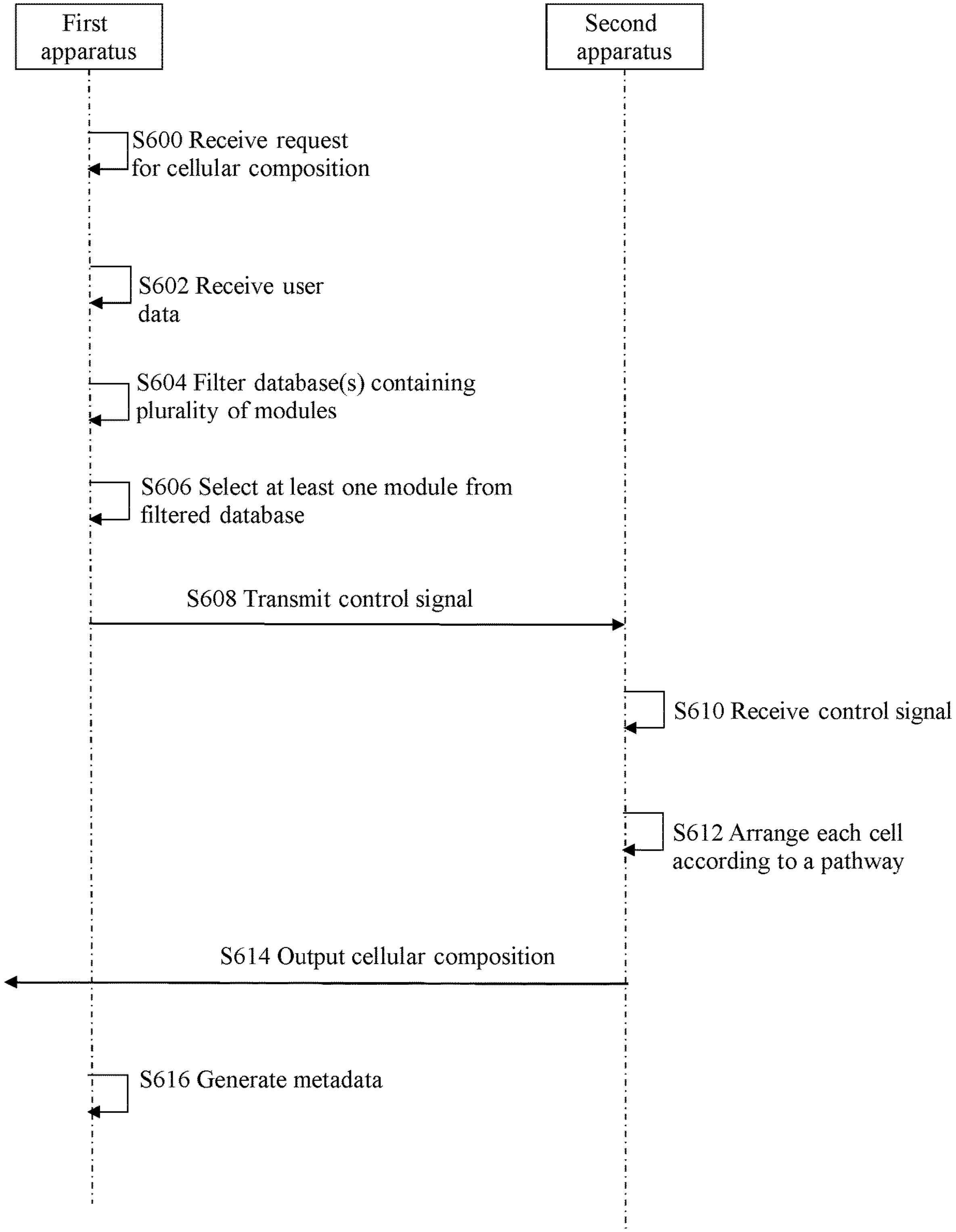
FIG. 18 shows a schematic diagram of the steps to generate a cellular composition.

FIG. 18 shows a schematic diagram of the steps to generate a cellular composition. The method of FIG. 18 is implemented using a first apparatus and a second apparatus. As explained earlier, the first apparatus may be a user device or a remote server, and the second apparatus may be a remote server or a music production component, for example. In embodiments, the method may involve a third apparatus, and steps of the method may be distributed across a first apparatus (e.g. remote server), a second apparatus (e.g. music production component) and a third apparatus (e.g. user device).

In the example embodiment of FIG. 18, the first apparatus may be a remote server and the second apparatus may be a music production component. At step S600, the first apparatus receives a request for a cellular composition. This may be received from a user device. The first apparatus receives user data (step S602), from a user device and/or from sensors or other devices monitoring user activity. The first apparatus filters, responsive to the received user data, at least one dataset containing a plurality of modules, where each module comprises a plurality of cells as explained above (step S604). The first apparatus selects at least one module from the filtered at least one dataset (step S606). The first apparatus transmits, to the second apparatus, a control signal comprising the selected at least one module (step S608). The second apparatus receives the control signal (step S610) and arranges, responsive to the control signal, each cell according to a pathway (step S612). The second apparatus outputs the cellular composition (step S614) either to the first apparatus or to a user device or elsewhere. The first apparatus (or the second apparatus) generates metadata associated with the cellular composition, as described earlier.

Figure 19:
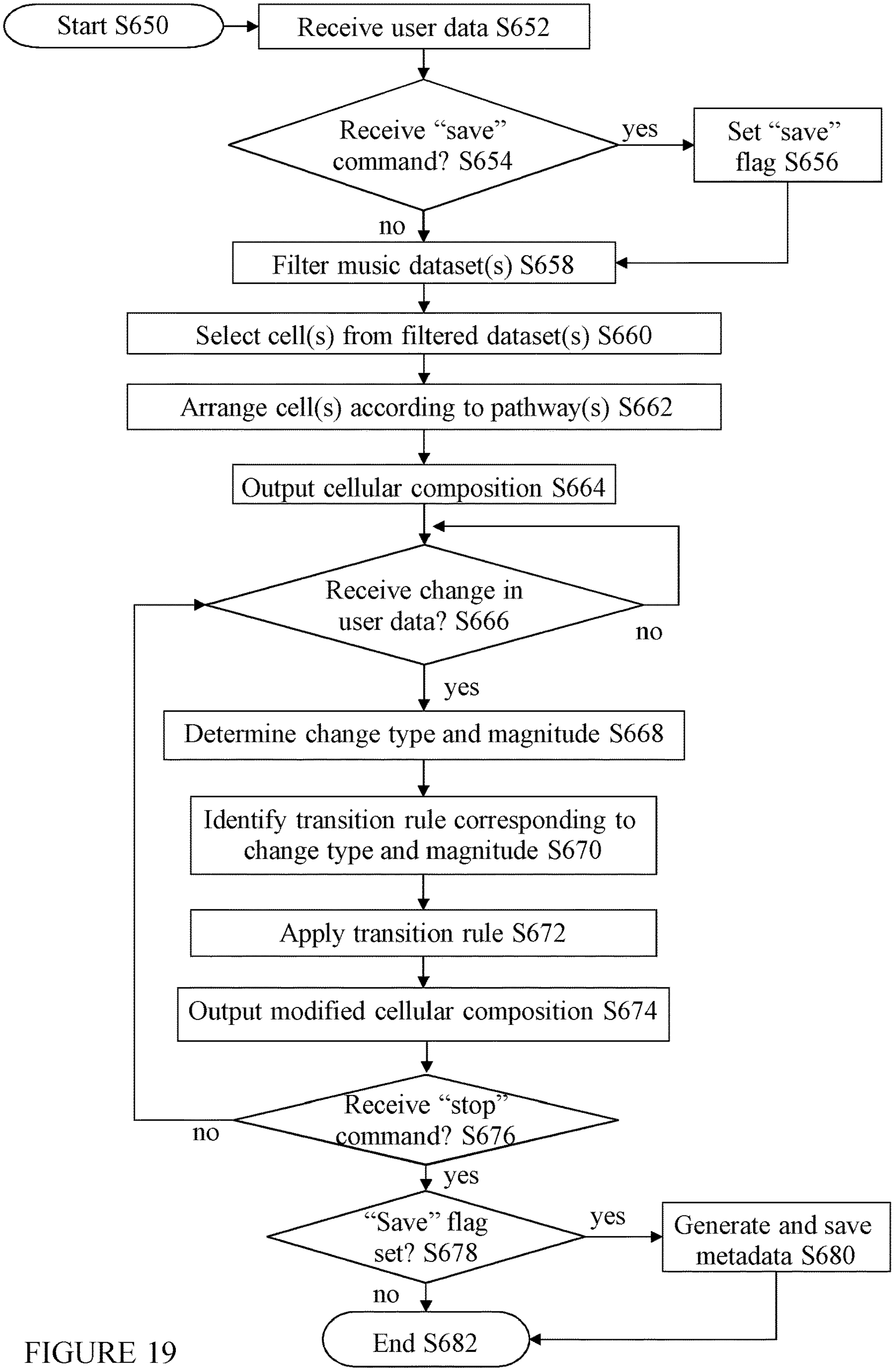
FIG. 19 shows a more detailed flowchart of example steps to generate a cellular composition.

FIG. 19 shows a more detailed flowchart of example steps to generate a cellular composition. The method begins at start step S650, which may be when a software app used to generate a cellular composition is initialised and/or when a request for a cellular composition is received. At step S652, user data is received as explained above. In the illustrated embodiment, the method comprises determining if a "save" command has been received (step S654). The method may comprise prompting the user to decide if they wish to save the cellular composition at the end of the process. For example, the method may comprise displaying a prompt on a display screen of a user device that asks a user to decide if the cellular composition is to be saved. As mentioned earlier, the cellular composition may not itself be saved, but instead metadata associated with the cellular composition may be generated and saved. Accordingly, the prompt to "save" may be a prompt to save metadata. In embodiments, the prompt may be provided to the user at the end of the cellular composition process. Additionally or alternatively, the method may save metadata associated with the cellular composition by default (and without requiring a user to make a "save" command).

If a save command is received at step S654 (from a user or from default settings), the method comprises setting a "save" flag or other indicator/reminder to save metadata at the end of the cellular composition process (step S656). Following step S656, or if saving is not required, the method comprises filtering, responsive to the received user data, at least one dataset containing a plurality of modules (step S658). The process to filter the music dataset(s) is similar to the process described with respect to step S36 of FIG. 3, and therefore is not repeated for the sake of conciseness. At step S660 at least one cell is selected from the filtered music dataset(s). In embodiments, one cell is selected from each of the harmony, beats and solo datasets, and optionally from the atmosphere dataset. The method comprises arranging each selected cell according to a pathway, as explained earlier with respect to FIG. 17 (step S662). At step S664, the cellular composition is outputted. In embodiments where the cellular composition is formed in the user device 10 (e.g. as described above with respect to FIG. 1*b*), the cellular composition can be output to the user via the audio module 24 of the user device 10 substantially immediately after the cellular composition is generated. In embodiments where the cellular composition is formed in a remote server or music production component, the generated music may be delivered to a user (via the user device 10) in any number of ways, including, for example, streaming or downloading. In embodiments, the remote server may notify the user device 10 that the cellular composition is ready for streaming/downloading, or alternatively, the remote server may automatically initiate the streaming process at the user device 10.

The cellular composition process may comprise modifying the cellular composition in real-time in response to changes in user data. For example, if the user's heartrate is determined to have changed (e.g. because they have switched from walking to running), the tempo of the cellular composition may be changed in response. Thus, at step S666 the method may comprise checking whether a change in user data has been received. This check may be performed at regular intervals, such as every 30 seconds, every minute, or every few minutes, for example. The regular intervals may be pre-defined or may be user-defined (e.g. based on user activity). For example, if a user is exercising, the user may wish the cellular composition to adapt to the user's changing heartrate or activity quickly and so may define the interval at which step S666 is to be performed. If no change in user data is received the method waits the pre-defined or user-defined interval before re-checking.

If a change in user data is received, the method may comprise modifying the cellular composition in response to the change in user data. In particular embodiments, a change in user data may not result in the cellular composition being modified. For example, if a user's heart rate changes within a particular range (e.g. by +/−5 beats per minute), the tempo of the cellular composition may not be changed to match the change in heartrate. In embodiments, the method may comprise using predetermined rules, lookup tables or other data to determine how to modify the cellular composition in response to the change in user data. At step S668, the method involves determining, for each change in user data, the change type and change magnitude. For example, the change in user data may comprise a change in the user's location and a change in the user's heartrate. Heartrate and location are example change types. The magnitude of the change may be determined by comparing the new location and heartrate to the previous location and heartrate, for example.

At step S670, the process comprises identifying, responsive to determining change type(s) and magnitude(s), at least one transition rule corresponding to each change in user data. Example transition rules are shown in FIG. 21. At step S672, the process comprises applying the at least one transition rule. For example, if the identified transition rule states that a change in module set is required, the process may comprise filtering at least one music dataset and selecting a new module set (or a module from a new module set). If the identified transition rule states that a change in key or chord is required, the process may comprise selecting a new cell within each existing module (or at least within the harmony module) and arranging the cells within each existing module along a new pathway. The modified cellular composition is then outputted (step S674).

In embodiments, the method comprises checking if a command to terminate the cellular composition process has been received (step S676). In embodiments, the cellular composition process may automatically terminate after a pre-determined period of time, and/or if no change in user data is received in a pre-determined period of time. If no "stop" or termination command has been received, the method may comprise looping back to check if any changes in user data have been received. If a stop command is received, the method may comprise checking if a "save" flag has been set (step S678). If the "save" flag has been set, the method comprises generating metadata associated with the cellular composition (step S680). Following step S680, or if no "save" flag is set, the cellular composition process then terminates (step S682).

The method shown in FIG. 19 and described above may be implemented in a user device (e.g. user device 10). Additionally or alternatively, particular steps of the method may be distributed between a user device and a remote server, or between a user device, a remote server and a music production component. For example, steps S666 to S670 may be implemented by a remote server (i.e. the apparatus which performs steps S652 to S660). The remote server may, after identifying the transition rule for each change type, send a modified control signal to a music production component, the modified control signal comprising instructions on how to modify the cellular composition. If the transition rule comprises changing a key/chord, the modified control signal may comprise instructions to change the key/chord (i.e. select a new cell within the harmony module). If the transition rule comprises switching to a new module, or to a new module set, the modified control signal may comprise the new module/module set or data identifying the new module/module set. Steps S672 to S674 may be implemented by the music production component (i.e. the apparatus which performs steps S662 to S664).

Figure 20:
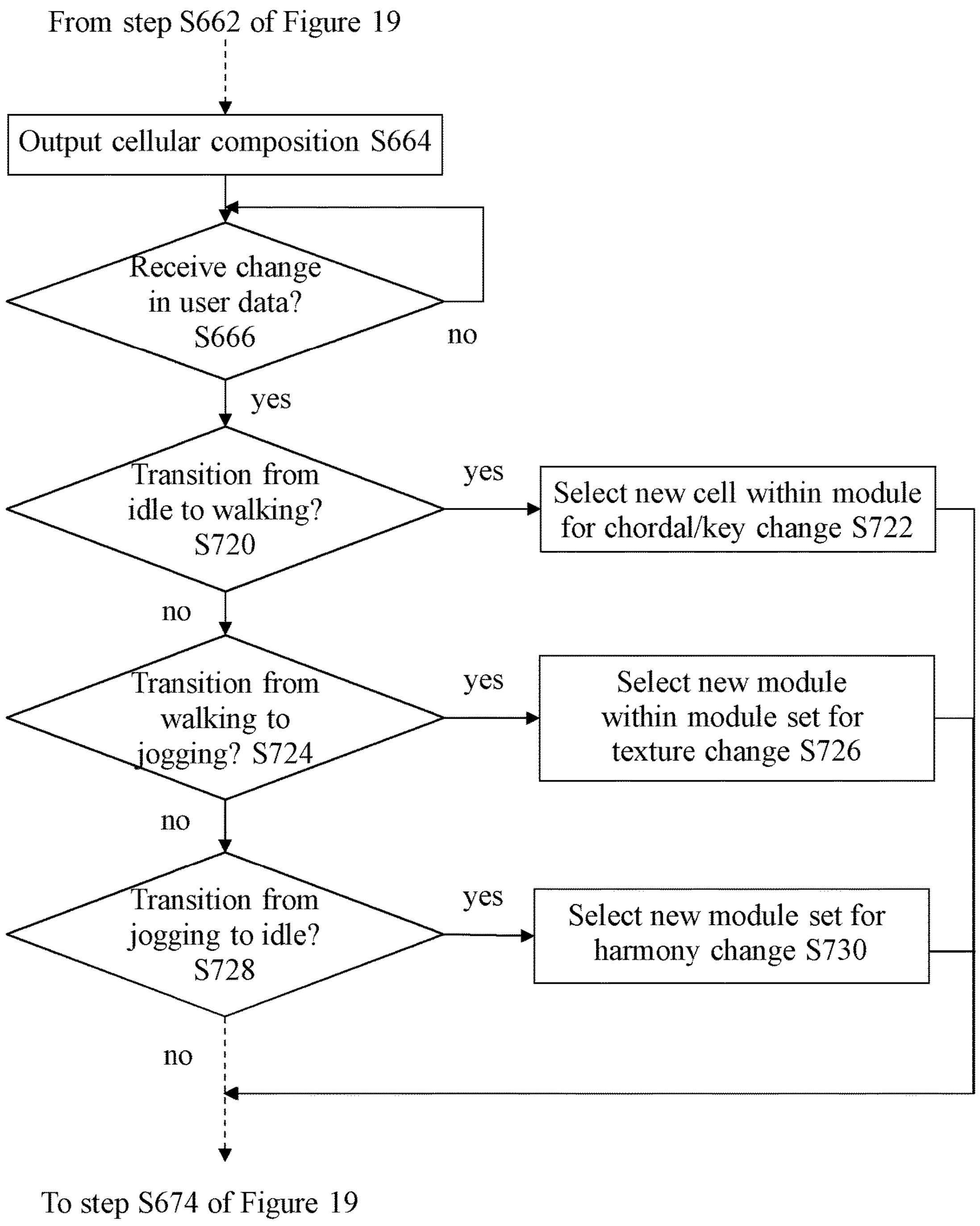
FIG. 20 shows a flowchart of example steps to modify a cellular composition in response to a change in user data.

FIG. 20 shows a flowchart of example steps to modify a cellular composition in response to a change in user data, in this case responsive to a change in user speed. The cellular composition process is substantially the same as that described with respect to FIG. 19 up until step S666. At step S666, the process comprises determining if a change in user data has been received. This check may be performed at regular intervals, such as every 30 seconds, every minute, or every few minutes, for example. The regular intervals may be pre-defined for the operation mode or may be user-defined (e.g. based on user activity). If a change in user data has been received, the process comprises determining the change type and magnitude. In this case, the change type is determined, in this example, to be a change in user speed. This change type may be determined from e.g. GPS data or indirectly from heartrate data. The next step is to determine the change magnitude and to apply a corresponding transition rule. Thus, at step S720, the process may comprise determining if the user has transitioned from an idle state (e.g. sitting/resting) to walking, or vice versa. This may be determined using GPS data, heartrate data, accelerometer data, etc, and by comparing the new data to the previous user data. If the magnitude of the change in user data is indicative of a user transitioning from idling to walking, then the process identifies a transition rule corresponding to this change type and magnitude. For example, the transition rule may require a new cell to be selected from the module to implement a chord/key change (step S722).

If at step S720 the user is not determined to transition from idling to walking, the process may comprise determining if the user has transitioned from walking to jogging (S724), or vice versa. If the magnitude of the change in user data is indicative of a user transitioning from walking to jogging (or vice versa), then the process identifies a transition rule corresponding to this change type and magnitude. For example, the transition rule may require a new module to be selected from the module set to implement a texture change (step S726).

If at step S724 the user is not determined to transition from walking to jogging, the process may comprise determining if the user has transitioned from idling to jogging (S728), or vice versa. If the magnitude of the change in user data is indicative of a user transitioning from idling to jogging (or vice versa), then the process identifies a transition rule corresponding to this change type and magnitude. For example, the transition rule may require a new module set to be selected from the module dataset(s) to implement a harmony change (step S730).

FIG. 20 merely shows an example of how cellular compositions may be modified based on changes in user data. The order of steps S720 to S730 is merely exemplary, and additional or alternative steps may be taken to modify the cellular compositions. After the cellular composition has been modified (or it has been determined that no modification is required), the process returns to step S674 of FIG. 19.

FIG. 21 shows a table of example change types and change magnitudes and example corresponding transition rules. Five example transition rules are shown, which are listed in order of increasing change magnitude. Broadly speaking, larger changes in user data (e.g. large changes in user speed or heart rate or direction of motion) may cause larger or more drastic changes to the cellular composition than smaller changes in user data. For example, when a user begins exercising, the user's heart rate and/or speed will likely increase significantly. This may cause a large change to the cellular composition, e.g. a change in module set (i.e. a change in harmony). A change in module set may be the most drastic change to the cellular composition. The smallest change to a cellular composition may be to simply switch to a new cell within a module (i.e. a change in key/chord). This type of change may be implemented if, for example, no change in user data is received after a specific duration has lapsed. A small change such a key/chord change may be implemented if the change in user data is small and frequent so, that small, frequent changes do not cause drastic changes to cellular compositions, which could be unpleasant to listen to. For example, an 'idle' to walking transition may occur frequently during a day when a user stops to open doors, stops to cross a road, gets up from her desk to walk to the printer or kitchen, etc. Thus, generally speaking, large changes in user data cause significant/dramatic changes to the cellular composition, and vice versa.

As shown in the table, different magnitudes of change in angular direction of a user cause a different transition rule to be applied. Changes in angle of +/−5° (relative the user's previous direction of motion) may not warrant any change in cellular composition. A small change in user direction (between +/−6° and up to +/−12°) may cause a chordal shift to be implemented (e.g. changing the cell within the harmony module to a different chord). A change in user direction between +/−50° and +/−89° may cause a module change to be implemented (e.g. changing to module within the existing module set). A change in user direction of +/−90° or more is significant enough to cause a change in module set. Similarly, when the user is determined to be in proximity to a new place of interest (e.g. a famous landmark in London), a module set change may be implemented. The module set change may be implemented for all module sets, or may simply be implemented for the atmosphere layer module set, for example.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

What is claimed is:

1. A method for cellular composition in a vehicle comprising:

at an apparatus in the vehicle:

receiving user data;

filtering, responsive to the received user data, at least one dataset containing a plurality of modules, each module comprising a plurality of cells, each cell comprising an item of music;

selecting at least one cell from the filtered at least one dataset; and arranging the at least one cell according to a pathway to form a cellular composition, where the pathway indicates a progression from one cell to another cell in a cellular composition;

receiving at least one change in user data, where the at least one change in user data comprises a change to one or more of: the speed of the vehicle, the location of the vehicle, and the angle or a direction of travel of the vehicle, modifying, responsive to the at least one change in user data, the cellular composition.

2. The method of claim 1, further comprising:

converting an electrical signal forming the cellular composition to an audio signal; and outputting the audio signal to a user.

3. The method of claim 1, where:

said selecting the at least one cell comprises:

selecting a first cell from a first filtered dataset, and selecting a second cell from a second filtered dataset based at least in part on properties of the first cell;

the method further comprises:

arranging the first cell according to a first pathway;

arranging the second cell according to a second pathway; and the first pathway and second pathway at least partly overlap.

4. The method of claim 1, where the user data comprises one or more of a time of received request to compose music, a date of received request to compose music, weather conditions when the request to compose music is received, biometric data, pace of the vehicle, speed of the vehicle, heart rate of a vehicle user, location of the vehicle, and angle or direction of travel of the vehicle.

5. The method of claim 1, where receiving the change in user data comprises:

receiving the change in user data from at least one of a sensor within the apparatus and an external source.

6. The method of claim 1, where said modifying the cellular composition comprises:

selecting at least one further pre-recorded item of music from the at least one dataset; and replacing one pre-recorded item of music in the cellular composition with the selected further pre-recorded item of music.

7. The method of claim 1, further comprising:

determining, for each change in user data, a change type and a change magnitude.

8. The method of claim 7, further comprising:

at the first apparatus:

identifying at least one transition rule corresponding to each determined change type and change magnitude; and applying the at least one transition rule to the cellular composition.

9. The method of claim 8, where said applying the at least one transition rule comprises:

identifying a cell in the cellular composition to be replaced;

determining properties of the identified cell;

selecting, based at least in part on the transition rule and the determined properties of the cell, a new cell from within the at least one dataset; and replacing the identified cell in the cellular composition with the new cell.

10. The method of claim 1, where at least one of the plurality of cells comprises a pre-recorded item of music.

11. The method of claim 10, further comprising:

selecting at least two pre-recorded items of music from at least two filtered datasets; and combining the selected pre-recorded items of music to generate the cellular composition.

12. The method of claim 11, further comprising:

modifying a characteristic of one or more selected pre-recorded item of music.

13. The method of claim 12, where said modifying a characteristic of one or more selected pre-recorded item of music comprises:

modifying at least one of pitch, key, melody, rhythm, timbre, form, and tempo.

14. The method of claim 1, where a music key is associated with a particular angle or particular direction of travel.

15. A non-transitory computer-readable storage medium, storing executable instructions thereon which, when executed by a processor, cause the processor to carry out the method of claim 1.

16. A vehicular system for generating cellular compositions for a user, comprising:

an apparatus configured to:

receive user data;

filter, responsive to the received user data, at least one dataset containing a plurality of modules, each module comprising a plurality of cells, each cell comprising an item of music;

select, responsive to the user data, at least one cell from the filtered at least one dataset; and arrange the at least one cell according to a pathway to form a cellular composition, where the pathway indicates a progression from one cell to another cell in the cellular composition;

receive at least one change in user data, where the at least one change in user data comprises a change to one or more of: the speed of the vehicle, the location of the vehicle, and the angle or a direction of travel of the vehicle;

modify, responsive to the at least one change in user data, the cellular composition.

17. The system of claim 16, where the vehicle comprises a car.

* * * * *